(12) United States Patent
Kodialam et al.

(10) Patent No.: US 7,920,991 B2
(45) Date of Patent: Apr. 5, 2011

(54) CHARACTERIZING THE CAPACITY REGION IN MULTI-CHANNEL, MULTI-RADIO MESH NETWORKS

(75) Inventors: Muralidharan S. Kodialam, Marlboro, NJ (US); Thyagarajan Nandagopal, Middletown, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1066 days.

(21) Appl. No.: 11/316,071

(22) Filed: Dec. 22, 2005

(65) Prior Publication Data
US 2007/0147248 A1    Jun. 28, 2007

(51) Int. Cl.
G06F 17/10    (2006.01)
(52) U.S. Cl. ............................................. 703/2; 370/329
(58) Field of Classification Search .......... 703/2; 370/235, 370/254, 328, 329
See application file for complete search history.

(56) References Cited

U.S. PATENT DOCUMENTS
2007/0025364 A1* 2/2007 Kodialam et al. ............. 370/400

OTHER PUBLICATIONS

Gupta et al., "The Capacity of Wireless Networks", IEEE Transactions on Information Theory, vol. 46, Issue 2, Mar. 2000, pp. 388-404.*
Kodialam et al., "Characterizing Achievable Rates in Multi-Hop Wireless Networks: the Joint Routing and Scheduling Problem", Proceedings of the 9th International Conference on Mobile Computing and Networking Sep. 2003, pp. 42-54.*
Kyasanur et al., "Routing and Interface Assignment in Multi-Channel Multi-Interface Wireless Networks", 2005 IEEE Wireless Communications and Networking Conference, vol. 4, Mar. 2005, pp. 2051-2056.*
Kyasanur et al., "Capacity of Multi-Channel Wireless Networks: Impact of Number of Channels and Interfaces", Proceedings of the 11th Annual International Conference on Mobile Computing and Networking, Aug. 2005, pp. 43-57.*
Ramanathan et al., "Scheduling Algorithms for Multihop Radio Networks", IEEE/ACM Transactions on Networking, vol. 1, Issue 2, Apr. 1993, pp. 166-177.*
McDiarmid, "On the Span in Channel Assignment Problems: Bound, Computing and Counting", Discrete Mathematics, vol. 266, Issues 1-3, May 2003, pp. 387-397.*
Mahonen et al., "Automatic Channel Allocation for Small Wireless Local Area Networks using Graph Colouring Algorithm Approach", 15th IEEE International Symposium on Personal, Indoor and Mobile Radio Communications, 2004, vol. 1, Sep. 2004, pp. 536-539.*
Murali Kodialam and Thyaga Nandagopal, "On the Capacity Region of Multi-Radio Multi-Channel Wireless Mesh Networks," In *IEEE WiMesh 2005*, Santa Clara, CA. Sep. 2005.
Murali Kodialam and Thyaga Nandagopal "Chacterizing the Capacity Region in Multi-Radio Multi-Channel Wireless Mesh Networks," In ACM Mobicom, Cologne, Germany, Sep. 2005.

* cited by examiner

*Primary Examiner* — Kamini S Shah
*Assistant Examiner* — Herng-Der Day
(74) *Attorney, Agent, or Firm* — Mendelsohn, Drucker, & Associates, P.C.

(57) ABSTRACT

A method of characterizing a capacity region in a multi-channel, multi-radio mesh network of nodes interconnected by links. The method includes: (a) modeling the network by determining one or more link-flow feasibility constraints; (b) obtaining a feasible upper-capacity bound by solving an optimization problem using the one or more link-flow feasibility constraints as necessary conditions; and (c) using an algorithm adapted to provide a feasible lower-capacity bound by (i) receiving the solution to the optimization problem as input, (ii) allocating channels to links to meet a demand vector that satisfies the one or more link-flow feasibility constraints, and (iii) scheduling flows along the allocated channels. The upper- and lower-capacity bounds define the capacity region.

22 Claims, 10 Drawing Sheets

Packing Dynamic Channel-Assignment Algorithm:

$NS = 0;\ A = E;\ d(e) = f^M(e)\ \forall e \in E$
While $A = \emptyset$
   $NS \leftarrow NS + T_d$
   Assume links are numbered in decreasing order of $d(e)$
   $z_S = 0\ \forall$ constraint sets $S$.
   For $e = 1, 2, \ldots E$
     If $\exists i$ such that $z_S = 0\ \forall S \in T(e, i)$
       $j = \arg\max_i c_i(e)$
       Assign $e$ to channel $i$
       $d(e) \leftarrow d(e) - T_d c_j(e)$
       If $d(e) = 0$ then $A = A \setminus e$
       Set $z_S = 1, \forall S \in T(e, j)$
     End If
   end For
end While Network Example
(Prior Art)

Interference Constraints

Unbounded Sufficiency Gap

Algorithm for solving sizing problem:

$w(j) = \delta$, $\forall j \in \{1,2,\ldots\mathcal{L}\}$ and $b=0$

While $\sum_j w(j) < j$

For $q = 1,2,\ldots, Q$ $r = r(q)$

While $r > 0$

Set weights of $\dfrac{\sum_{j:\ (e,i) \in S'_j}\ \alpha\ (j)/\beta\{S'_j\}}{c_i(e)}$ on each pair $(e,i)$ and compute $P^*$, the shortest path from $s(q)$ to $d(q)$.

Let $u = \min_j f(P^*, j)$.

$\delta = \min\{r, u\}$    $r \leftarrow r - \delta$.

$f_i(e) \leftarrow f_i(e) + \delta$ and $w(j) \leftarrow w(j)\left(1 + \dfrac{\epsilon\delta}{f(P^*, j)}\right) \forall j$.

end While end For $b \leftarrow b+1$ end While

Compute $\rho = \max_j \sum_{(e,i) \in S'_j} \dfrac{f_i(e)}{c_i(e)}$

Output $\lambda^* = \dfrac{b}{\rho}$

FIG. 4

Balanced Static Channel-Assignment Algorithm:

$l_S = 0$, $\forall$ constraint sets $S'$; $A = \emptyset$ $p(e) = \sum_i f_i(e), \forall e \in E$ While $\sum_{e' \in E} p(e') > 0$ For $e \in E \setminus A$ $m(e,i) = \max_{S' \ni (e,i)} l_S$, $\forall i \in OC$ $w(e) = \min_i m(e,i)$ $b(e) = \arg\min_i m(e,i)$ end For $l = \min_{e \notin A} w(e)$ Assign $l$ to channel $b(l)$ $l_S = l_S + p(l), \forall S' \ni (l, b(l))$ $f_{b(l)}(l) = p(e); f_i(l) = 0, \forall i \neq b(l)$ $A = A \cup l;\ p(l) = 0$ end While

FIG. 5

Packing Dynamic Channel-Assignment Algorithm:

$NS = 0;\ A = E;\ d(e) = f^M(e)\ \forall e \in E$

While $A \neq \emptyset$ $NS \leftarrow NS + T_d$

Assume links are numbered in decreasing order of $d(e)$ $z_S = 0\ \ \forall$ constraint sets $S$.

For $e = 1, 2, \ldots E$

If $\exists i$ such that $z_{S'} = 0\ \forall S' \in T(e,i)$ $j = \arg\max_i c_i(e)$ Assign $e$ to channel $i$ $d(e) \leftarrow d(e) - T_d c_j(e)$

If $d(e) = 0$ then $A = A \setminus e$

Set $z_{S'} = 1, \forall S' \in T(e,j)$

End If end For end While

FIG. 6

Greedy Channel-Scheduling Algorithm:

$NS = 0; A = E; d(e) = f^M(e) \, \forall e \in E$

While $A \neq \emptyset$ $NS \leftarrow NS+1; iter=1$

Sort links in decreasing order of $d(e)$.
    Assume links are numbered in decreasing order of $d(e)$ $z_S = 0 \quad \forall$ constraint sets $S$.

While $iter=1$ $iter=0$

For $e=1,2,...E$

If $\exists i$ such that $z_S = 0 \,\, \forall S \in T(e,i)$ $j = \arg\max_i c_i(e)$ Assign $e$ to channel $i$ $iter=1$ $d(e) \leftarrow d(e) - T_d c_j(e)$

If $d(e)=0$ then $A = A \setminus e$

Set $z_S = 1, \forall S \in T(e,j)$

End If end For end While end While

FIG. 15

CHARACTERIZING THE CAPACITY REGION IN MULTI-CHANNEL, MULTI-RADIO MESH NETWORKS

BACKGROUND OF THE INVENTION

1. Field of the Invention

The present invention relates, generally, to network routing and scheduling, and more particularly, to the computation of capacity, and algorithms to achieve capacity, in multi-channel, multi-radio (e.g., wireless) mesh networks.

2. Description of the Related Art

The emergence of broadband wireless networks has been spurred by the development of standards such as IEEE 802.11 a/b/g and 802.16. These networks are being deployed as a solution to extending the reach of the last-mile access to the Internet, using a multi-hop configuration. In multi-hop networks, communication between two end nodes is carried out through a number of intermediate nodes whose function is to relay information from one point to another. Many such networks are already in use, ranging from prototype testbeds to complete commercial solutions. As shown in FIG. 1, one popular deployment method is to use one standard, such as IEEE 802.16, for intercell communications, i.e., back-hauling traffic on the multi-hop wireless relay backbone, while using another standard, such as 802.11 a/b/g, for intracell communications, i.e., to carry traffic over the last hop to the user. This isolates traffic on the wireless backbone from the fluctuating load and interference from the last-hop end users.

Fixed multi-channel, multi-hop wireless networks with multiple radios per node are referred to as MC-MR networks. Such MC-MR networks typically have the following characteristics:

1. There are multiple wireless channels of operation, and these channels are orthogonal to each other.
2. Nodes have multiple radio transceivers, which allow them to communicate, interference-free and simultaneously, with more than one neighbor at the same time using different channels.
3. Full-duplex operation is possible at each node, i.e., a node can be receiving from or transmitting to a neighbor i on channel A, while transmitting to or receiving from neighbor j on channel B, where $A \neq B$.
4. The number of orthogonal wireless channels could be limited in number, which implies that more than one node in a given region could contend for the same channel at the same time, thereby resulting in interference and collisions.
5. The radios (also referred to as Network Interface Cards, or NICs) at each node are capable of fast switching between channels, with a switching overhead. Channels can be assigned for communication between neighbors in a static or dynamic fashion. In a static link-channel assignment, every link between a pair of neighboring nodes is bound to a particular channel, and this binding does not vary over time. In dynamic link-channel assignment, the bindings between a link and the operating channel for that link can vary dynamically with time. While dynamic assignment involves negotiation, it also provides more flexibility to combat interference.

One of the main goals in the design of fixed wireless broadband networks is capacity planning. Within this realm, given a set of end-to-end demands, there are multiple design goals for which a network can be optimized, e.g., maximizing a function of the rates where the function can be chosen to be a user utility function or a network price function, ensuring some notion of rate fairness, or minimizing end-to-end delays. Every design goal involves designing routes, assigning channels, and scheduling packets to meet such goals.

Numerous studies have considered routing, channel assignment, and scheduling for such networks. Some have studied the problem of finding efficient routes to maximize throughput, some have considered only channel assignment and scheduling, and others have considered both routing and scheduling. However, all of these previous studies considered only a subset of the problem, e.g., addressing only the question of how to improve throughput compared to other known algorithms.

SUMMARY OF THE INVENTION

In one embodiment, the present invention provides a method of characterizing a capacity region in a multi-channel, multi-radio mesh network of nodes interconnected by links. The method comprises: (a) modeling the network by determining one or more link-flow feasibility constraints; (b) obtaining a feasible upper-capacity bound by solving an optimization problem using the one or more link-flow feasibility constraints as necessary conditions; and (c) using an algorithm adapted to provide a feasible lower-capacity bound by (i) receiving the solution to the optimization problem as input, (ii) allocating channels to links to meet a demand vector that satisfies the one or more link-flow feasibility constraints, and (iii) scheduling flows along the allocated channels. The upper- and lower-capacity bounds define the capacity region.

In another embodiment, the present invention provides a multi-channel, multi-radio mesh network of nodes interconnected by links. The network comprises an apparatus for characterizing a capacity region. The apparatus is adapted to: (a) model the network by determining one or more link-flow feasibility constraints; (b) obtain a feasible upper-capacity bound by solving an optimization problem using the one or more link-flow feasibility constraints as necessary conditions; and (c) use an algorithm adapted to a feasible lower-capacity bound by (i) receiving the solution to the optimization problem as input, (ii) allocating channels to links to meet a demand vector that satisfies the one or more link-flow feasibility constraints, and (iii) scheduling flows along the allocated channels. The upper- and lower-capacity bounds define the capacity region.

In a further embodiment, the present invention provides an apparatus for characterizing a capacity region in a multi-channel, multi-radio mesh network of nodes interconnected by links. The apparatus is adapted to: (a) model the network by determining one or more link-flow feasibility constraints; (b) obtain a feasible upper-capacity bound by solving an optimization problem using the one or more link-flow feasibility constraints as necessary conditions; and (c) use an algorithm adapted to a feasible lower-capacity bound by (i) receiving the solution to the optimization problem as input, (ii) allocating channels to links to meet a demand vector that satisfies the one or more link-flow feasibility constraints, and (iii) scheduling flows along the allocated channels. The upper- and lower-capacity bounds define the capacity region.

BRIEF DESCRIPTION OF THE DRAWINGS

FIG. 4 shows exemplary pseudo-code for a primal-dual algorithm to solve a sizing problem;

FIG. 5 shows exemplary pseudo-code for a primal-dual algorithm to implement a Balanced Static-Channel Assignment (BSCA) algorithm;

FIG. 6 shows exemplary pseudo-code for a primal-dual algorithm to implement a Packing Dynamic-Channel Assignment (PDCA) algorithm;

FIG. 15 shows exemplary pseudo-code for a greedy scheduling algorithm;

DETAILED DESCRIPTION

Figure 1:
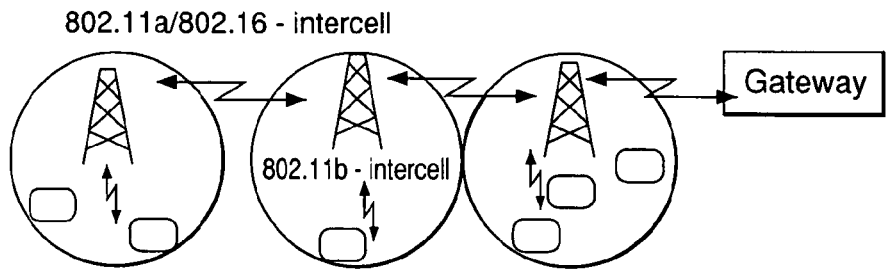
FIG. 1 shows an exemplary multi-hop network employing a first standard for intercell communications and a second standard for intracell communications.

A problem that has not previously been addressed in multi-channel, multi-radio networks is how to characterize the capacity region, i.e., the set of all feasible rate vectors, of the network for a given optimization objective. The present invention, in various embodiments, addresses the question of how to characterize the capacity region of a network for a given optimization objective. This capacity-planning question is addressed herein by developing algorithms to jointly optimize the routing, link-channel assignments, and scheduling for such networks, in order to obtain upper and lower bounds for the capacity region under a given objective function. In certain embodiments, a network model is proposed which captures the important practical aspects of, and characterizes the constraints binding the behavior of, systems involving multiple orthogonal channels and nodes that have the ability to communicate simultaneously with many neighbors using multiple radios over orthogonal channels. Necessary conditions are provided to verify the feasibility of rate vectors in these networks, and these conditions are used to derive upper bounds on the capacity in terms of achievable throughput, using a fast primal-dual algorithm. (As used in this specification, the term "necessary" should be interpreted based on its mathematical definition and not as limiting the scope of the claimed invention.) Two link-channel assignment schemes, one static and the other dynamic, are developed in order to derive lower bounds on the achievable throughput. Through simulations, it is demonstrated that the dynamic link-channel assignment scheme performs close to optimal on the average, while the static link-channel assignment algorithm also performs very well. The methods according to various embodiments of the present invention can provide valuable tools for network designers in planning network deployment and for optimizing different performance objectives.

A first feature of the present invention, in certain embodiments, is the development of a network model that characterizes the multi-hop and multi-radio features in a fixed broadband wireless network with a limited number of orthogonal channels and with multiple radios at each node. This model provides both necessary and sufficient conditions for a feasible channel assignment and schedule in the network, using a protocol model of interference, e.g., as set forth in Gupta, P., and Kumar, P. R., "The Capacity of Wireless Networks," *IEEE Transactions on Information Theory,* 46(2), pp. 388-404, 2000. This model also has the flexibility of specifying neighbors and interferers for each node in an arbitrary fashion to suit the actual system needs. This model may further be extended to permit the modeling of multiple heterogeneous wireless standards that have inherent rate diversity, allowing interoperability among these standards as part of a unified multi-channel multi-radio mesh network.

A second feature of the present invention, in certain embodiments, is the provision (due to the NP-hardness of the joint routing and scheduling problem) of a relaxation of the above model. This relaxed model uses a linear program that gives the necessary conditions for a valid feasible solution. In addition to computing feasibility of a solution for a given objective function, this model can also identify potential bottlenecks that cause performance to degrade, which is an important requirement for network capacity planning.

A third feature of the present invention, in certain embodiments, is the consideration, among the many possible capacity-planning objectives, of the fundamental problem of feasibility of a given end-to-end demand vector, and the design of a fast primal-dual algorithm for a fully-polynomial time-approximation solution (FPTAS), which provides an upper bound to the feasibility problem. This algorithm is extensible to the optimization of similar rate-based objective functions that are useful for characterizing the capacity region.

A fourth feature of the present invention, in certain embodiments, is the proposal of three different link-channel assignment algorithms, which allocate channels to links in order to meet any given demand vector that satisfies the constraints imposed by the network model. These algorithms are referred to herein as (i) Balanced Static-Channel Assignment (BSCA), (ii) Packing Dynamic-Channel Assignment (PDCA), and (iii) Greedy-Channel Scheduling (GCS). These algorithms are applicable to any objective function used for capacity planning. The BSCA algorithm performs static link-channel assignment followed by greedy coloring for conflict resolution, while the PDCA and GCS algorithms perform link-channel assignment and scheduling simultaneously. The PDCA and GCS algorithms give an achievable lower bound on the capacity and can be used to compare the performance of any channel-assignment algorithm and evaluate how it performs with respect to the obtained capacity upper bound.

A fifth feature of the present invention, in certain embodiments, is the performance of extensive simulations on a range of graphs, showing that the aggregate (joint routing, link-channel assignment and scheduling) performance is very close to the optimum in practice for the PDCA and GCS algorithms, even though computing the optimal schedule is a well-known NP-hard problem with no known performance bounds, even for the simple case of one channel and one radio per node for general graphs. The performance of the BSCA algorithm is also quantified, and avenues for further performance improvements are identified.

The solutions proposed by the present invention for general graphs, in certain embodiments, are non-trivial because the computation of the feasible scheduling space is NP-hard, even if a subset of restrictive classes of graphs also known as (r, s)-civilized graphs is examined, e.g., as set forth in Krumke, S., Marathe, M., and Ravi, S. S., "Models and Approximation Algorithms for Channel Assignment in Radio Networks," *ACM Wireless Networks*, vol. 7(6), pp. 575-584, 2001, and Alicherry, M. A., Bhatia, R., and Li, L., "Joint Channel Assignment and Routing for Throughput Optimization in Multi-radio Wireless Mesh Networks," *ACM Mobicom*, 2005. In addition, the link-channel assignment problem is also NP-hard, e.g., as set forth in A. Raniwala, K. Gopalan and T. Chiueh, "Centralized Algorithms for Multi-channel Wireless Mesh Networks," *ACM Mobile Computing and Communications Review*, April 2004. Even if it is assumed that there is no interference in the network, the optimum cannot be computed in polynomial time. Thus, the teachings of the present invention, in certain embodiments, extend both to the research community and to network planners and expand the teachings of other references, such as those directed to the optimization of the placement of nodes in a multi-hop wireless access network, e.g., as in Qiu, L., Chandra, R., Jain, K., and Mahdian, M., "Optimizing the Placement of Integration Points in Multi-hop Wireless Networks," *IEEE ICNP*, 2004.

The underlying network model and the definitions and terminology used herein will first be explained.

In a fixed multi-hop wireless network with n nodes, the network is represented by a directed graph G=(V,E,E$^1$), where V represents the set of nodes in the network, E represents the set of directed links that can carry data (data links), and E$^1$ denotes the set of directed links that indicate interference but cannot carry data (interference links). Data links and interference links are assumed herein to be bi-directional. If node u can transmit directly to node v (and vice-versa), then this condition is represented by a link, u↔v∈E, between node u and node v, with the link belonging to the set E. If node u can only interfere with node v (and vice-versa) but cannot transmit data to it, then this condition is represented by a link in u ↔v∈E$^1$. It is noted that a link u↔v∈E implies that node u is within the communication range of node v, while u↔v∈E$^1$ implies that node u is within the interference and/or carrier-sensing ranges of node v. These ranges need not be fixed but can vary based on the network topology, potential obstacles, and the terrain of deployment.

There are C orthogonal channels in the network, denoted by the set OC=1, 2, . . . , C. In the IEEE 802.11b standard, C=3. Although IEEE 802.11b actually has 12 channels, only 3 channels can operate simultaneously without interfering with one another. Each node v has κ(v) radios. One of the practical constraints on radios is that it is not useful to have two radios tuned to the same channel at a given node, since local interference at the node will ensure that only one of them is active at any time. Therefore, it is possible that κ(v)≦C, although this is not a restricting factor in the model discussed herein.

Given a data link e∈E, t(e) represents the transmission end of link e, and h(e) the receiving end of link e. A data link e is said to be active when there is a transmission from t(e) to h(e). Each data link e has capacity $c_i(e)$ on channel i. It is assumed that, for a given topology, the capacity is fixed for any given channel across a link. In other words, $c_i(e)$ does not change over time. (If a feasible rate vector is recomputed every $T_f$ time slots, then this assumption can be relaxed to saying that $c_i(e)$ is constant over $T_f$ time slots.) A flow on data link e using channel i is denoted by $f_i(e)$. The variable $g_i(e)$ is defined as the utilization of channel i over link e, wherein $g_i(e)=f_i(e)/c_i(e)$.

Given a node v∈V, N(v) denotes the set of neighbors of node v with data links to and from node v. These data links are denoted by the set E(v). It is also assumed that all link capacities, flows, and rates are rational numbers. The notations in the following Table 1 are used herein:

TABLE 1

| v | Set of vertices | N | Number of nodes |V| |
|---|---|---|---|
| E | Set of data links | E$^I$ | Set of interference links |
| G | Network graph | τ | Length of a time slot |
| t(e), e∈E | Transmitting node of link e | h(e), e∈E | Receiving node of link e |
| OC | Set of orthogonal channels, |OC| = C | κ(v) | Number of radios at node v |
| $c_i(e)$ | Capacity of channel i over link e | $f_i(e)$ | Flow rate of channel i over link e |
| $g_i(e)$ | Utilization of channel i over link e (i.e., $f_i(e)/c_i(e)$) | ρ(e) | Maximum number of channels available for link e |
| N(v) | Set of data-link neighbors of node v | N$^I$(v) | Set of interference-link neighbors of node v |
| E(v) | Set of data links incident on node v | E$^I$(v) | Set of interference links incident on node v |

It is assumed that the system operates in a synchronous time-slotted mode, where the length of a time-slot is τ seconds. For an asynchronous system, the results of using the present invention, in certain embodiments described herein, will serve as an upper bound on the performance of the system.

The present invention, in certain embodiments, employs a protocol interference model, e.g., as given in Gupta, P., and Kumar, P. R., "The Capacity of Wireless Networks," *IEEE Transactions on Information Theory*, 46(2), pp. 388-404, 2000. In this model, a transmission on channel i over link e is successful when all potential interferers in the neighborhood of sender t(e) and receiver h(e) are silent on channel i for the duration of the transmission. This is similar to the model used in IEEE 802.11, based on a RTS-CTS-Data-ACK sequence, as set forth in IEEE Std. 802.11-1999, "Part 11: Wireless LAN Medium Access Control (MAC) and Physical Layer (PHY) Specifications," 1999. The interference neighborhood of a node v is defined to be the set of nodes that can interfere with node v. This is the set of nodes that have either a data link or an interference link incident on node v. The protocol model of interference captures the behavior of the Carrier Sense Multiple Access/Collision Avoidance (CSMA/CA) protocol (a network contention protocol that listens to a network in order to avoid collisions), which assumes bi-directionality of links for correct operation.

With respect to link-channel assignment, every node makes two decisions at the beginning of each time slot: (i) which node (if any) it is going to communicate with, and (ii) the channel on which this communication is going to take place. Both of these decisions are negotiated between neighboring nodes, and then transmission takes place. The decision of which channel on which to communicate can either (i) be done on a per-time-slot basis or (ii) be fixed for the entire lifetime of the network (or fixed for a long time until the demands change). A method wherein the channel on which communication takes place between neighbors is decided at the beginning of each time slot is referred to as Dynamic Link-Channel Assignment. A method wherein the mapping of links to channels is fixed for the entire lifetime of the network is referred to as Static Link-Channel Assignment.

In both cases, if the number of radios at a node is less than the number of neighbors (and the number of orthogonal channels available), then the node can be expected to switch its radios to various channels in order to make use of the multiple channels available, as set forth, e.g., in P. Kyasanur and N. Vaidya, "Routing and Interface Assignment in Multi-Channel Multi-Interface Wireless Networks," *IEEE WCNC,* 2005. It might be expected that the throughput of static-channel allocation would be lower than dynamic-channel allocation, due to the fact that static-channel allocation is a special case of dynamic-channel allocation. However, under static-channel assignment, the only decision a node makes is to determine which neighbor (if any) with which it is going to communicate in a given time slot, since the channel on which to communicate with the neighbor is already fixed and therefore does not need to be negotiated. Algorithms for both of these versions of the link-channel assignment problems are disclosed herein, as well as results on the performance of both of these algorithms, with varying numbers of channels and radios.

Several design considerations are relevant to the determination of feasibility constraints, including link-channel restriction, interference links, channel allocation, and multi-path routing.

As to link-channel restriction, a node can be active simultaneously on $\kappa(v)$ channels at the same time, and any subset m of these channels can be used to talk to one neighbor, assuming that the neighbor has at least m radios. Each data link e can be restricted to use no more than a certain number of channels $\mathcal{L}(e)$.

As to interference links, a description follows explaining how to model the constraints based on data links and interference links. Beyond that, to maintain clarity of presentation, it will be assumed herein that there are no interference links in the graph. It should be understood that this is only to present certain embodiments of the invention in a more focused manner, and that the algorithms set forth herein should not need to be modified when interference links are present.

As to channel allocation, the network characterization developed below is applicable to both static-channel allocation and dynamic-channel allocation methods. As noted above, existing constraints on hardware, e.g., as set forth in Chandra, R., Bahl, V., and Bahl, P., "MultiNet: Connecting to multiple IEEE 802.11 networks using a single wireless card," *IEEE Infocom,* 2004, may preclude fast dynamic switching or impose a non-negligible throughput penalty. Since the goal of certain embodiments of the present invention is to characterize and seek the maximum throughput possible, it is assumed that channel switching can be performed with a negligible overhead, without affecting capacity.

As to multi-path routing, choosing only one route between a source and a destination does not exploit the inherent multipath diversity present in mesh networks for maximizing throughput. Therefore, multi-path routing will be used for routing end-to-end flows.

The approach of the present invention, in one embodiment, is to solve a cross-optimization problem with a given objective for an instance of an MC-MR multi-hop network in three steps: (a) first, the constraints placed by the nodes, channels, interference model, and the network parameters on the feasibility of a flow are determined, (b) link-flow feasibility constraints are used as necessary conditions, and the optimization problem using the stated objective is solved, and (c) link-channel assignment (static and/or dynamic) is performed, along with scheduling based on greedy coloring to resolve potential conflicts, and a feasible schedule from the solution in step (b) is obtained. It is noted that step (c) gives a feasible lower bound on the optimum solution, while step (b) provides an upper bound.

A mathematical-constraint model for the MC-MR fixed wireless mesh network described above, including channel, node, and interference constraints, will now be presented. It is assumed that, given a link-flow set $f=\{f_i(e)\}, f_i(e)$ is the desired flow on channel $i \in OC = \{1, 2, \ldots, C\}$ over link $e \in E$. The objective now is to determine necessary and sufficient conditions for this link-flow vector to be achievable in the network in terms of a valid schedule.

In order to achieve this link flow, a 0-1 scheduling variable $y_i^t(e)$ is first defined, as follows:

$$y_i^t(e) = \begin{cases} 1 & \text{if link } e \text{ is active on channel } i \text{ in time slot } t \\ 0 & \text{otherwise} \end{cases}$$

It is noted that $y_i^t(e)$ is set to 1 if there is a transmission on channel i over link e in time slot t. It is also noted that $y_i^t(e)=0$, $\forall i \in OC$, $\forall t$ when $e \in E^1$. In other words, interference links do not carry data.

As to link-channel constraints, by definition, the maximum number of channels that can be active on link e at any time slot t is $\varrho(e)$. Thus, the constraint of the following Inequality (1) holds true:

$$\sum_{i \in OC} y_i^t(e) \leq \varrho(e), \forall e \in E, \forall t. \tag{1}$$

As to node-radio constraints, a node can use at most $\kappa(v)$ radios in a given time slot for transmission, reception, or both transmission and reception, which leads to the constraint of the following Inequality (2):

$$\sum_{e \in E(v)} \sum_{i \in OC} y_i^t(e) \leq \kappa(v), \forall v \in V, \forall t. \tag{2}$$

As to interference constraints, it is initially assumed that the antennas are omni-directional and that $E^1=\emptyset$, i.e., there are no interference links in the set. The derivation of the interference constraint using, e.g., the approach in Kodialam, M., and Nandagopal, T., "The Effect of Interference on the Capacity of Multi-hop Wireless Networks," *IEEE Symposium on Information Theory,* June 2004, which uses these assumptions, will now be briefly outlined, and will then be extended to cover interference links.

The IEEE 802.11-based RTS-CTS-DATA-ACK model is considered in order to identify pairs of nodes that can simultaneously transmit. In this model, neighbors of both an intended transmitter and receiver refrain from both transmission and reception. In the ideal case, only transmitters in the neighborhood of the receiver remain silent. While that case can also be modeled using the approach described herein, only the model in which neighbors refrain from both transmission and reception will be used, in order to keep the presentation simple.

Interference will occur only among users sharing the same channel, e.g., channel i. Given a node v and its neighborhood N(v) in G, one of the links e in E(v) is active on channel i, and node u is the other endpoint of the link. For e to be active on channel i, all other links incident on node v, E(v)\e, are idle, and, in addition, each neighbor of node v remains idle, on channel i. The same argument applies to node u. For silencing N(v), due to the non-overlapping neighborhoods of nodes in N(v), separate constraints are used, as follows:

$$\sum_{e \in E(v) \cup E(v')} y_i^t(e) \leq 1, \forall v' \in N(v), \forall i \in OC, \forall t.$$

Figure 2:
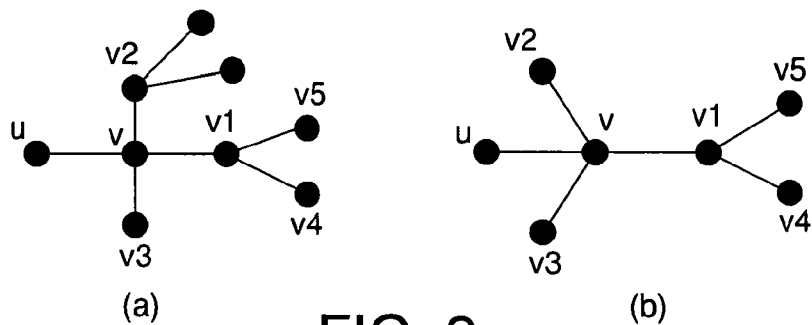
FIG. 2(a) shows interference constraints for an exemplary link uv and nodes $v_1, v_2 \in N(v)$.
FIG. 2(b) shows interference constraints for an exemplary link $v \leftrightarrow v_1$.

This is illustrated in FIG. 2(a) for link uv and nodes $v_1$, $v_2 \in N(v)$.

Interestingly, these constraints are the same whenever any link incident on node v is active, since it prevents other links incident on $\{v\} \cup N(v)$ from being active at the same time on the same channel. Therefore, these constraints can be rewritten as follows:

$$\sum_{e \in E(v) \cup E(v')} y_i^t(e) \leq 1, \forall v' \in N(v), \forall v \in V, \forall i \in OC, \forall t.$$

This is illustrated in FIG. 2(b) for link $v \leftrightarrow v_1$.

Thus, the interference constraint may be formally stated in terms of a link e, as given in the following Inequality (3):

$$\sum_{e' \in E(t(e)) \cup E(h(e))} y_i^t(e') \leq 1, \forall i \in OC, \forall e \in E, \forall t. \quad (3)$$

It is noted that, under this approach, there are only |E| interference constraints in all, with the number of variables per constraint never exceeding twice the maximum degree of the graph. The reduction in number of constraints significantly reduces the complexity of modeling interference and increases the convergence speed of any linear optimization problem using these constraints, as will be shown subsequently.

As to interference links, if there is an interference link, $e \in E^I$ between two nodes $v_1$ and $v_2$ on channel i, then whenever one of the data links incident on either of the nodes is active, the other node is silent for that slot on channel i. It can be seen that, if the previous interference constraint is rewritten for an interference link e, then only the data links incident on either of the endpoints can be included. Thus, the interference constraints for the general graph in the following Inequality (4) may be derived, clarifying this distinction:

$$\sum_{e' \in E(t(e)) \cup E(h(e))} y_i^t(e') \leq 1, \forall i \in OC, \forall e \in E \cup E^I, \forall t. \quad (4)$$

The following Table 2 lists these three constraints that characterize the MC-MR wireless network G:

TABLE 2

| Integer Linear Programs: 0-1 Variables (Necessary & Sufficient Conditions) | Linear Programs: Continuous Variables (Necessary Conditions) |
|---|---|
| $\Sigma_{i \in OC} y_i^t(e) \leq \rho(e), \forall e \in E, \forall t$ | $\Sigma_{i \in OC} g_i(e) \leq \rho(e), \forall e \in E$ |
| $\Sigma_{e \in E(v)} \Sigma_{i \in OC} y_i^t(e) \leq \kappa(v), \forall v \in V, \forall t$ | $\Sigma_{e \in E(v)} \Sigma_{i \in OC} g_i(e) \leq \kappa(v), \forall v \in V$ |
| $\Sigma_{e' \in E(t(e)) \cup E(h(e))} y_i^t(e') \leq 1, \forall i \in OC, \forall e \in E \cup E^I, \forall t$ | $\Sigma_{e' \in E(t(e)) \cup E(h(e))} g_i(e') \leq 1, \forall i \in OC, \forall e \in E \cup E^I$ |

Each of these three constraints characterizes one of a channel constraint, a node constraint, and an interference constraint, respectively, and thus, Inequalities (1), (2), and (4) are conditions, which are both necessary and sufficient, to check for the feasibility of a link schedule in the MC-MR network G.

While the necessary and sufficient conditions are used to check for the feasibility of link-channel assignments (as will subsequently be explained), the variables in these inequalities are binary variables, and as such, they are inconvenient to use in any optimization problem, as they lead to Integer Linear Programming (ILP) problems that are much harder to solve than linear programs defined on continuous variables. Moreover, the variables are time-indexed, which makes the problem size very large. Therefore, a relaxation of the integer constraints to continuous variables in terms of link flows is desirable.

Over a period of time [0,T], the fraction of time link e is active on channel i is given by $(\Sigma_{t \leq T} y_i^t(e))/T$. Therefore, the mean flow on channel i over link e is given by the following Equation (5):

$$f_i(e) = \frac{c_i(e) \sum_{t \leq T} y_i^t(e)}{T}. \quad (5)$$

The mean utilization $g_i(e)$ of channel i over link e over the period [0,T], has been defined above as $g_i(e)=f_i(e)/c_i(e)$.

Inequality (1) is summed over all $t \leq T$, the order of summation is interchanged, and the result is divided by T to arrive at:

$$\sum_{i \in OC} \frac{\sum_{t \leq T} y_i^t(e)}{T} \leq \varrho(e), \forall e \in E.$$

Now, using Equation (5), the relaxed condition in terms of utilizations and link flows is defined as follows:

$$\sum_{i \in OC} g_i(e) = \sum_{i \in OC} \frac{f_i(e)}{c_i(e)} \leq \varrho(e), \forall e \in E.$$

The same operations can be performed for the other two necessary and sufficient conditions in Inequalities (2) and (4)

to obtain the constraints in terms of link utilizations. Thus, the following Lemma 1 may be stated:

Lemma 1. For the multi-channel multi-radio multi-hop wireless network under consideration, if a given link-flow set f does not satisfy the following Inequalities (6-8), then the link-flow set f is not schedulable:

$$\sum_{i \in OC} g_i(e) \leq \varrho(e), \forall e \in E, \quad (6)$$

$$\sum_{e \in E(v)} \sum_{i \in OC} g_i(e) \leq \kappa(v), \forall v \in V, \quad (7)$$

$$\sum_{e' \in E(t(e)) \cup E(h(e))} g_i(e') \leq 1, \forall i \in OC, \forall e \in E \cup E^I. \quad (8)$$

Due to the relaxation of the integer variables by averaging, the above Inequalities (6-8) are only necessary conditions and are no longer sufficient conditions. A simple example is a four-cycle A↔B↔C↔D↔A. If the capacity on each link is 1, then a link flow of 1/3 on each link satisfies the necessary conditions, for a total link utilization of 4/3, but it is not sufficient, since only one link can be active at any time, resulting in a total link utilization of 1. In fact, the gap between the necessary and the optimal conditions can be unbounded, as illustrated by the following example.

Figure 3:
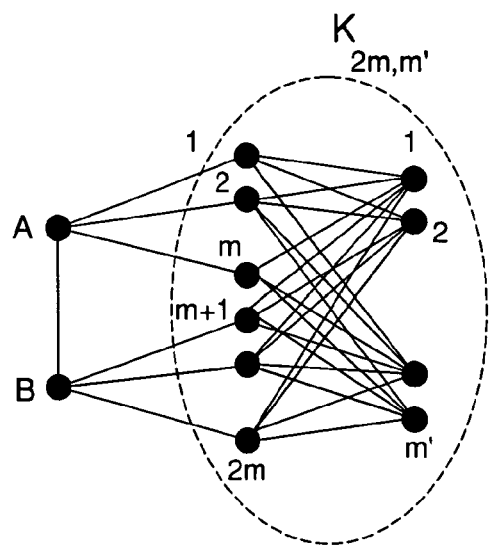
FIG. 3 shows an exemplary network operating on a single channel with one radio per node.

The network shown in FIG. 3, operating on a single channel with one radio per node, will now be considered. In this network, $K_{2m,m'}$ represents a complete bipartite graph with 2m vertices in one partition and m' vertices in another partition, with m'<2m. There are a total of 2m(m'+1)+1 links in the network, all with capacity 1 each. Taking into account all of the necessary conditions, a maximum flow of 1=(m+m'+1) over each link is feasible, resulting in an aggregate link utilization of $$\frac{2m(m'+1)+1}{m+m'+1} = \frac{2(m'+1) + \frac{1}{m}}{\left(1 + \frac{1+m'}{m}\right)} = O(m').$$

However, only one link can be active at any time in this network due to interference. This may be seen by considering any link e. The end-points of e are either (i) both A and B or (ii) one of the 2m nodes in the middle. If e=AB, then none of the 2m nodes in the middle can be transmitting or receiving data, thereby silencing the rest of the network. If one of these 2m nodes is communicating with either A or B, then all of the m' nodes on the right are silent, and this, in turn, implies that the remaining (2m−1) nodes in the middle are silent. The same argument applies if one of nodes in the middle is communicating with one of the nodes on the right. Accordingly, the total optimal link utilization is 1. Thus, the difference between the solution that merely satisfies the necessary conditions and the optimum solution is O(m'), which can be unbounded as m increases.

Other such configurations are possible, e.g., complete subgraphs (cliques), odd cycles, etc. A complete characterization of these so-called "forbidden" subgraphs may be impractical. (A common characteristic among all forbidden subgraphs is the existence of cycles. It is possible, therefore, that if graph G is a tree, then the relaxed necessary conditions might also be sufficient. Accordingly, there should be no interference links in G and no path redundancy. Since this has no practical application, it will not be further discussed herein.) However, what is important is that the ILP constraints in Table 2 are both necessary and sufficient for any network graph. The gap arises only due to relaxation of the integer constraints. Any solution satisfying the necessary conditions will be an upper bound of the optimal solution. Therefore, by using these necessary conditions as optimization constraints, upper performance bounds can be derived, and then a feasible lower bound can be computed using channel assignment and scheduling, based on the solution from the optimization problem. This approach will mitigate the impact of the optimality gap.

It is noted that all of the constraints described above have a common structure, namely, $\mathcal{L}$ sets composed of (link, channel) pairs, $S_1, S_2, \ldots, S\mathcal{L}$ that are defined on links e and colors i∈OC. The necessary and sufficient conditions (using binary variables) take the general form $\Sigma_{(e,i) \in S_j} y_i^r(e) \leq \beta(S_j)$, $\forall j$, while the necessary conditions (using continuous variables) have the general form $\Sigma_{(e,i) \in S_j} g_i(e) \leq \beta(S_j)$, $\forall j$, where $\beta(S_j)$ is the right-hand side constant associated with the constraint identified by that set. For example, $\beta(S_j)=1$ for the sets identified by the interference constraints, and $\beta(S_j)=\kappa(v)$ for the sets identified by the node-radio constraints.

The following Lemma 2 is a restatement of Lemma 1 in a generic form:

Lemma 2. Let $S_1, S_2, \ldots, S\mathcal{L}$ represent sets of (link, channel) pairs identified by the constraints in Lemma 1, with $\beta(S_j)$ being the associated constant for each set $S_j$. Let f represent a link-flow set $\{f_i(e)\}$, where $f_i(e)$ represents the flow on channel i over link e. If f does not satisfy the following Inequality (9), then link-flow set f is not schedulable:

$$\frac{1}{\beta(S_j)} \sum_{(e,i) \in S_j} g_i(e) \leq 1, \forall j \in \{1, 2, \ldots, \mathcal{L}\}. \quad (9)$$

Given the foregoing set of constraints that characterize an MC-MR wireless mesh network, the problem of optimization of throughput criteria subject to these constraints may now be addressed.

A standard multi-commodity flow problem on the MC-MR network is defined as follows: a set of sources s want to send data to a set of destinations d with an end-to-end rate demand vector $\bar{r}$. There might be multiple objectives of interest to the network planner, e.g., (a) achievability of the demand vector, (b) maximizing aggregate network throughput or the sum of end-to-end rates subject to minimum rate requirements, (c) maximizing the minimum end-to-end rate, (d) maximizing the aggregate utility function of the end-to-end rates, and/or (e) imposing certain fairness criteria on the rates in the network. All of these problems can be solved using the framework described herein. First, the constraints identified earlier from link-flow variables are translated to end-to-end rate variables.

It is assumed that the traffic demand for different source-destination pairs is given in the form of a rate vector $\bar{r}$. It is assumed that rate vector $\bar{r}$ (depending on the optimization objective, $\bar{r}$ can also be set to 0) has Q<n(n−1) components. Each source-destination pair between which there is a request will be termed a commodity. The variable q will be used to index the commodities, wherein s(q) represents the source node for commodity q and d(q) the destination node for commodity q. The variable r(q) represents the flow to be routed from s(q) to d(q). The following optimization problem is to be solved:

INPUT: A directed graph $G=(V,E,E^1)$ with a link speed $c_i(e)$ for channel i∈OC, data link e∈E, Q node pairs (s(q),d(q)), and a desired rate r(q) associated with each node pair q.

OUTPUT: Either (i) a set of routes, link-channel assignments, and associated schedule that achieves the given rates, or else (ii) declare the problem infeasible.

Recalling that multiple paths can exist between s(q) and d(q) for each commodity q, the result set forth in the following Theorem 3 can be shown:

Theorem 3. Given a graph $G=(V,E,E^1)$, with link speed $c_i(e)$ associated with data link $e \in E$ and channel $i \in OC$, and Q source-destination pairs $(s(q),d(q))$ for $q=1, 2, \ldots, Q$ with a desired flow rate $r(q)$ between $s(q)$ and $d(q)$, let $x_i^q(e)$ be the flow on channel i over data link e that belongs to end-to-end flow q. A necessary condition for rate vector $\bar{r}$ to be achievable is the existence of link flows $x_i^q(e)$, $\forall i,q,e$ that satisfy the following constraints:

$$\sum_{e:t(e)=s(q)} \sum_{i \in OC} x_i^q(e) = r(q), \forall q,$$

$$\sum_{e \in E_{in}(v)} \sum_{i \in OC} x_i^q(e) = \sum_{e \in E_{out}(v)} \sum_{i \in OC} x_i^q(e), \forall v \neq s(q), d(q), \forall q,$$

$$\frac{1}{\beta(S_j)} \sum_{(e,i) \in S_j} \frac{\sum_{q \leq Q} x_i^q(e)}{c_i(e)} \leq 1, \forall q, j.$$

The first constraint ensures that the end-to-end rate is met. The second constraint maintains flow balance at intermediate nodes in the network for each end-to-end flow. The third constraint is a restatement of Inequality (9) in terms of $x_i^q(e)$, since $f_i(e) = \Sum_{q \leq Q} x_i^q(e)$.

An alternative formulation of the above conditions is an arc-path formulation. If $P_q$ represents the set of (link, channel) pairs for source-destination pair q, and considering a path $P \in P_q$, with $x(P)$ representing the amount of flow sent on path P, this path leads from s(q) to d(q). From the demand requirements, it is noted that $$\sum_{P \in P_q} x(P) = r(q), \forall q.$$

The total amount of flow on channel i over link e, represented by $f_i(e)$ is given by $$f_i(e) = \sum_q \sum_{P \in P_q : (e,i) \in P} x(P).$$

The variable I(Pj) represents the set of (link, channel) pairs that are on path P and are also in set Sj, i.e., $I(P, j) = \{(e,i):(e,i) \in P\} \cap \{(e,i):(e,i) \in S_j\}$. Since $f_i(e) = g_i(e)c_i(e)$, from Inequality (9), the amount of flow permitted by set $S_j$ on path P is given by $$F(P, j) = \beta(S_j) \left( \sum_{e \in I(P,j)} \frac{1}{c_i(e)} \right)^{-1}.$$

The flow that can be sent on path P is denoted by $F(P) = \min_{j \in \mathcal{L}} F(Pj)$. The variable $F(\cdot)$ represents flow on paths and the variable $f(\cdot)$ represents flow on links. The necessary conditions for a rate vector $\bar{r}$ to be achievable are given by $$\sum_{P \in P_q} x(P) = r(q), \forall q,$$

$$\sum_{(e,i) \in S_j} \frac{\sum_q \sum_{P \in P_q : P \ni (e,i)} x(P)}{\beta(S_j)c_i(e)} \leq 1, \forall j \in \{1, 2, \ldots, \mathcal{L}\}.$$

Given a rate vector $\bar{r}$, the strategy then is to solve for the x variables that satisfy the necessary conditions.

As mentioned above, there are many objectives of interest for the network capacity planner that can be solved using an optimization framework. Each objective is associated with some additional constraints that are specific to the chosen objective. For example, maximizing the sum of end-to-end rates might be associated with a minimum rate constraint for each source-destination pair.

The characterization of certain embodiments of the present invention permits these constraints to be "plugged in" to the optimization problem, together with necessary rate constraints identified above, to obtain an upper bound on the performance for that objective.

To demonstrate the flexibility of the approach of certain embodiments of the present invention, the fundamental optimization problem of feasibility is considered, i.e., whether a given rate-demand vector can be achieved in the network. The optimization framework of certain embodiments of the present invention is used to derive upper bounds, and the procedure to obtain lower bounds for this problem will be described below.

Instead of solving the feasibility problem directly, the feasibility problem is instead written in the form of a concurrent flow problem. In this concurrent flow problem, the desired rate vector is scaled, and the objective is to determine the maximum scaling factor that still satisfies the necessary conditions. It is noted that there can be an exponential number of paths between two given nodes in the network, resulting in an exponential number of variables in the path-arc formulation. A formulation consistent with certain embodiments of the present invention permits avoidance of this problem, however, using a primal-dual approach based on shortest-path routing.

First, the feasibility problem is written as a concurrent flow problem, and then a primal-dual algorithm is used to solve the linear programming problem.

The primal and dual problems and solutions may be characterized as follows:

1. If the primal problem has a variables and b resource constraints, then the dual problem will have b variables and a resource constraints, where the constraint matrix of the dual problem is the transpose of the constraint matrix of the primal problem.

2. There is a one-to-one correspondence between the primal constraints and the dual variables, i.e., a variable in the dual problem is paired with an inequality in the primal problem, and similarly for the primal variables and the dual constraints.

3. The objective function of the dual problem is determined by the right-hand side of the primal constraints, and similarly for the objective function of the primal problem and the right-hand side of the dual constraints.

The problem of determining the achievability of rate vector $\bar{r}$ can be formulated as the following exemplary Linear Programming Formulation (I):

maximize $\lambda$, subject to:

$$\sum_{(e,i) \in S_j} \frac{\sum_q \sum_{P \in \mathcal{P}_q : P \ni (e,i)} x(P)}{\beta(S_j) c_i(e)} \leq 1, \forall j \in \{1, 2, \ldots, L\}, \quad \text{(I)}$$

$$\sum_{P \in \mathcal{P}_q} x(P) = 1 r(q), \forall q,$$

$$x(P) \geq 0, \forall P \in P_q, \forall q.$$

The optimal solution to the linear programming problem above is represented by λ*, which represents the maximum scaling factor by which flows can be scaled up and still satisfy the necessary constraints. Therefore, if λ*<1, then the rate vector is not feasible. The largest rate vector that still satisfies the necessary constraints is λ* r̄, given by the optimal path flow vector x̄*. Given a slot length of r seconds, a determination is made whether r̄ bits can be scheduled in a schedule of length at most 1/τ. Thus, if L* is the smallest length of a schedule that can schedule x*=λ*r̄ bits, then the schedule corresponds to a flow vector $$\frac{\lambda^* \bar{r}}{L^* \tau}.$$

For this achievable flow to be at least r̄, λ* should be greater than or equal to L*τ. The sufficiency gap created by relaxing the integer constraints (given by Inequalities (1), (2), and (4)) is denoted by the interval [1, L*τ), which represents the interval during which the existence of a schedule cannot be guaranteed.

The dual to this problem will now be formulated, and a fully-polynomial time-approximation algorithm (FPTAS) will be computed using a primal-dual algorithm. The FPTAS' algorithm and its analysis follows, e.g., as in the method presented in Garg, N., and Könemann, J., "Faster and Simpler Algorithms for Multi-commodity Flow and other Fractional Packing Problems," *Proceedings of the 39th Annual Symposium on Foundations of Computer Science*, pp.300-309, 1998.

The dual to the linear program set forth above assigns a weight a(u) to each set Sj in the network, and the dual variable z(q) for the rate-scaling constraint (the second set of constraints) in the linear program, as follows:

$$\text{minimize} \sum_j \alpha(j), \text{ subject to:}$$

$$\sum_{(e,i) \in P} \frac{\sum_{j:(e,i) \in S_j} \alpha(j) / \beta(S_j)}{c_{i(e)}} \geq z(q), \forall P \in \mathcal{P}_q, \forall q,$$

$$\sum_{q=1}^{Q} r(q) z(q) \geq 1,$$

$$\alpha(j) \geq 0, \forall j \in \{1, \ldots, \mathcal{L}\}.$$

FIG. 4 shows exemplary pseudo-code for implementing an algorithm to solve this primal-dual program in order to solve the sizing problem, which starts by assigning a weight of δ to all sets $S_j$. The algorithm proceeds in phases. In each phase, for each commodity q, r(q) units of flow are routed from s(q) to d(q). A phase ends when commodity Q is routed. The r(q) units of flow from s(q) to d(q) for commodity q are sent via multiple iterations. In each iteration, a path P* from s(q) to d(q) is determined, and F(P*) represents the capacity of this path. A flow of at most F(P*) units can be sent during this iteration. Since r(q) units of flow are sent for commodity q in each phase, the actual amount of flow sent is the lesser of (i) F(P*) and (ii) the remaining amount of flow to make up r(q) in this phase. Once the flow is sent, the weights of the nodes that carry the flow are increased. The algorithm then alternates between sending flow along shortest-path pairs and adjusting the length of the links along which flow has been sent, until the optimal solution is reached. Therefore, the primal-dual algorithm solves a sequence of shortest-path problems. It can be shown that, by choosing ε and δ appropriately, the optimal solution can be approximated as closely as desired. The running time increases with the accuracy needed. The following Theorem 4 states the running time and the correctness of the algorithm set forth in the pseudo-code of FIG. 4.

Theorem 4. The algorithm in FIG. 4 computes a $(1-\epsilon)^{-3}$-optimal solution to the flow-scaling problem in time that is polynomial in Q, $\mathcal{L}$, n, and 1/ε, where Q is the number of commodities, $\mathcal{L}$ is the number of constraining sets, and n is the number of nodes.

The linear program described above gives an upper bound on the achievable rates in the mesh network. The solution to this linear program is used to assign channels to the links and also to schedule the time slots in which each link and channel are active. Both of these problems are NP-hard, and variations of the greedy approach may be used to solve the problem. There are two versions of this problem that are solved herein. The first version is the Static Link-Channel Assignment Problem, wherein link-channel assignments are made to the links at the beginning and subsequently remain fixed over all time slots. The second version of the problem, which assigns channels to links every $T_d$ slots ($T_d \geq 1$), is the Dynamic Link-Channel Assignment problem. The dynamic link-channel assignment results for the case of $T_d=1$ will provide a basis for comparison of the performance of all link-channel assignment algorithms, since it provides the maximum flexibility in link-channel assignment and scheduling. The following discussion assumes that only one channel can be allotted to a given link, i.e., a (node, neighbor) pair. In other words, $\varrho(e)=1 \forall e \in E$. The algorithms set forth herein can be easily generalized for $\varrho(e) > 1$. The GCS algorithm (described below) is a generalization of the Dynamic-Link Assignment case when $\varrho(e) > 1$.

In the Balanced Static-Channel Assignment (BSCA) algorithm, an (almost) greedy approach is first used in solving the static-channel assignment problem. Once this link-channel assignment is done, time slots are assigned to each channel using a coloring algorithm. This assignment of time slots to channels is done almost independently for each channel. The channels interact during assignment of time slots only to resolve the node-radio constraint (Inequality (2)) at each node in the network. Recalling that network model constraints are modeled by sets $S_1, S_2, \ldots, S_A$, these sets are specified by (link, channel) pairs. If the link-channel assignment results in a large number of channels being assigned to one set, then a large number of time slots will be used to resolve the conflicts in this set, which will result in an inefficient schedule. Therefore, the main idea behind the BSCA is to ensure that none of the constraint sets are loaded by any channel. Accordingly, the total load that is assigned to each constraint set is tracked. At the end of solving the linear programming problem, $\hat{x}_i^q(e)$ represents the flow on link e corresponding to commodity q and channel i. First, $f_i(e)$, which represents the flow on link e corresponding to channel i and all commodities q, is determined as $$f_i(e) = \sum_{q \leq Q} \hat{x}_i^q(e).$$

Given a particular link e, T(e,i) denotes the constraint sets that contain pair (e,i). The variable $l_s$, which denotes the total flow that has been assigned to constraint set S, is initialized to zero for all sets. At a generic step in the algorithm, it is assumed that a channel is to be assigned to link e. (An elaboration of how this link is selected will be described below.) First, it is determined, for each channel i∈OC, that $m(e,i) = \max_{S \in T(e,i)} l_S$, representing the maximum load on any constraint set that contains the (link, channel) pair (e,i). Then, link e is assigned to channel j that attains the minimum value of m(e,i) over all channels. That is to say, link e is assigned to the channel j, where $j = \arg\min_i m(e,i)$. Once this is done, the flow on all of the sets in T(e,j) is incremented by $\Sigma_i f_i(e)$, since all of the flow on link e becomes assigned to channel j. As stated earlier, the main intuition behind the scheme is to not allow any interference set to be overloaded with any channel. This is the reason for selecting a min-max allocation, since it ensures that the load on the constraint sets is distributed as much as possible among the given channels.

The inventors experimented with three different methods of selecting link e: (1) selecting a link at random, (2) selecting links in a predetermined order, and (3) selecting a link whose $\min_i m(e,i)$ is the lowest. From these experiments, it has been determined that the third option outperforms the first two, and all of the results given below reflect this implementation.

FIG. 5 shows exemplary pseudo-code for implementing a Balanced Static-Channel Assignment algorithm consistent with one embodiment of the present invention. At the end of static link-channel assignment, the result is a set of flows assigned to links that have been assigned to a particular channel. All of the flows are then scaled so that they are integers. All of the flows are multiplied by a large number M, with the fractional part ignored. Time slots are then assigned to each channel separately, while ensuring that the node-radio constraint is met, so that the number of active links incident on a node in a given time slot is always, at most, the number of radios at the node. This is done via a greedy coloring algorithm applied to each channel separately.

A link e is assigned to channel i with a scaled flow $f_i'(e)$. The collection of constraint sets that contain pair (e,i) is represented by $T_i(e,i)$. The greedy coloring algorithm is as follows:

1. The link e with the highest residual flow $f_i'(e)$ is considered;

2. The smallest color (time slot) k that does not occur more than $\beta(S_j)$ times in set $S_j \in T_1(e,i)$, $\forall j$ is assigned;

3. Smallest color k is added to all sets in $T_1(e,i)$;

4. The scaled flow is reduced by $c_i(e)\tau$, where τ is the length of a time slot; and 5. Steps 1-4 are repeated until all flows have been scheduled.

If NS denotes the maximum number of time slots taken by any channel, then the demand met by this system is given by $$\frac{M}{NS} \lambda * \bar{r},$$

where $\lambda * \bar{r}$ is the linear-program-optimal solution, and M is the multiplicative factor used to convert the link flows to integer values.

In static link-channel assignment, it is assumed that each link is assigned to a channel, and that channels cannot be switched during different time slots. In dynamic link-channel assignment, it is assumed that every link has the ability to switch channels once every $T_d$ time slots ($T_d \geq 1$). The channels still should respect the constraints imposed by Inequalities (1), (2), and (4). This implies that, apart from the coordination of the nodes at the end of the links, there is coordination across different links to perform link-channel assignment at the beginning of each time period. Though this may be difficult in practice, when $T_d = 1$, dynamic link-channel assignment gives the highest flexibility to maximize the achievable performance for any link channel-assignment scheme.

Since the problem of determining the optimal link-channel assignment is NP-hard, a packing-based heuristic may be used to approximate the optimal solution. The desired flow on link e corresponding to channel i is represented by $f_i(e) = \Sigma_{q \leq Q} \hat{x}_i^q(e)$. Once the solution of the linear programming problem is obtained, all of the link flows are scaled to make them integers. If all of the data is rational, then the solution of the linear program is rational and therefore can be scaled to integers. Since a primal-dual scheme is being used, the answers will be fractional, and therefore, the flows are scaled by a suitably large value M, so that the eliminated fractional portion is negligible. (In the experiments described herein, M=100.) Once these flows are obtained, the objective is to assign these flows to channels in as few time periods as possible.

In the Packing Dynamic-Channel Assignment (PDCA) algorithm consistent with one embodiment of the invention, flows are packed in a greedy manner in each time period. In this embodiment, each link can be assigned to only one channel in each time period. Since the link flows do not necessarily have to be assigned to channels that are given by the solution to the linear program, all of the flows on the different channels on a given link can first be aggregated into a single scaled flow on the link denoted by $f^M(e) = \Sigma_i f_i(e)$. As the flows are packed in each time period, the amount of unassigned flow on link e is denoted by d(e). At the beginning of each time period $T_d$, the links are sorted in descending order of the unassigned flows. The first link e is assigned to the channel $j = \arg\max_i c_i(e)$, and the value of d(e) is decremented by $c_j(e)T_d$. Then, a determination is made whether the next link in the ordered list can be assigned to some channel in this time period. If this can be done, then such a channel with the highest capacity is selected and the link is assigned to that channel. If this link cannot be assigned to any channel, then this process is attempted for the next link, and is repeated until the end of the list is reached. If there are still unassigned flows, this process moves to the next time period, and the link assignment process is repeated. The objective is to assign all flows in as few time periods as possible.

One way to determine whether a particular channel is feasible for a data link in a time period is by having a binary variable $z_S$ associated with each constraint set S. At the beginning of each time period of length $T_d$, binary variable $z_S$ is set to zero. Whenever a data link e is assigned channel i and (e,i)∈S, binary variable $z_S$ is set to 1. It is also ensured that the node-radio constraint is respected at each node by verifying that the number of channels allocated to a given node in any time period is not greater than the number of radios at that node.

FIG. 6 shows exemplary pseudo-code for implementing a PDCA algorithm, wherein T(e,i) is used to denote the collection of constraint sets that are associated with link-channel pair (e,i), and NS is used to count the number of time periods. As in the static-channel allocation, the demand met by the system is computed as $$\frac{M}{NS}\lambda*\bar{r},$$

where $\lambda*\bar{r}$ is the optimal solution to the linear program, and M is the multiplicative factor used to convert the link flows to integer values.

Results of simulations evaluating the performance of certain embodiments of the present invention will now be discussed, highlighting the following three aspects:

1. The ability of the necessary conditions, based on continuous flow variables, to model the capacity of the network in practical circumstances;
2. The performance of the (dynamic) PDCA algorithm for $T_d=1$ with respect to the capacity of the network; and
3. The performance of the simpler (static) BSCA algorithm along with greedy scheduling with respect to the dynamic link-channel assignment algorithm.

While the algorithms presented herein were evaluated for various random topologies, grids, full meshes, and other types of topologies, results from only grids and random topologies will be discussed. As has been previously discussed, in these simulations, $\varrho(e)=1, \forall e \in E$. Also, only networks with no separate interference links, i.e., $E^1=\emptyset$, were considered. In all of the experiments, the number of radios per node were set to be the same across all nodes, i.e., $\kappa(v)=\kappa, \forall v \in V$, and the links were set to be of unit capacity for all channels, $c_i(e)=1, \forall i \in OC, \forall e \in E$. It is also noted that all channels were orthogonal. Wireless-channel errors were not modeled, since the goal was to estimate the maximum capacity of the network.

First, a fixed 5×6 grid topology with 30 nodes was considered, with each node having, at most, 4 neighbors in the grid. The grid was divided into four quadrants, and one node in each quadrant was assigned to be a sink node for flows. Then, for each node in the grid, the closest sink node was assigned as the destination for its flow, with all flows having a demand of 1 unit.

Figure 7:
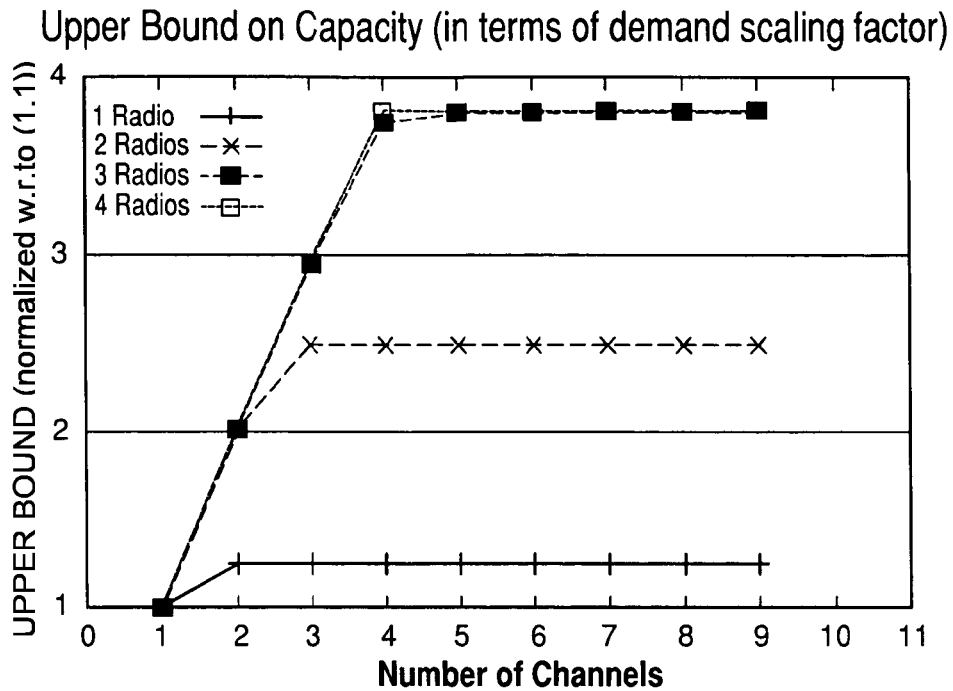
FIG. 7 is a graph showing simulation results for capacity upper bound with varying numbers of channels in a fixed-grid topology consistent with one embodiment of the present invention.
Figure 8:
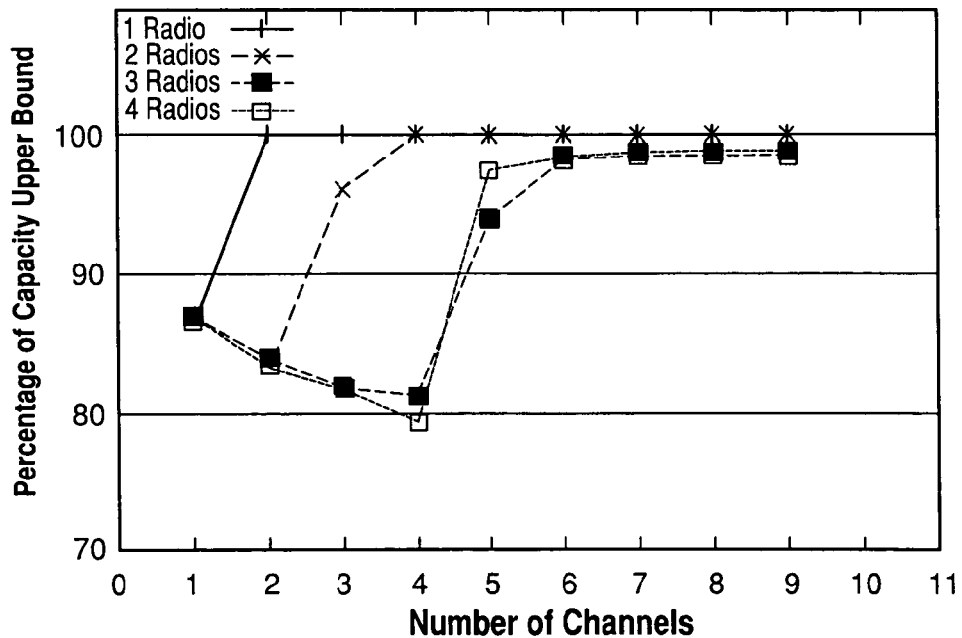
FIG. 8 is a graph showing simulation results for the performance of a PDCA algorithm in a fixed-grid topology consistent with one embodiment of the present invention.
Figure 9:
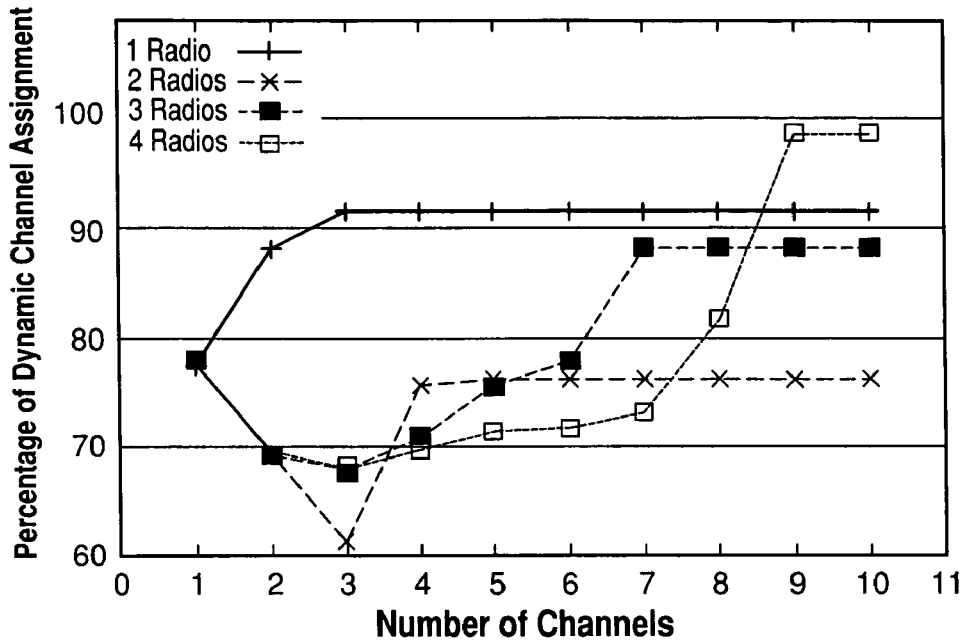
FIG. 9 is a graph showing simulation results for the performance of a static BSCA algorithm with respect to a PCDA algorithm in a fixed-grid topology consistent with one embodiment of the present invention.

The number of flows in the grid was varied from 5 to 25. Three parameters were measured for each set of flows: (a) the capacity upper bound, (b) the BSCA (static assignment) lower bound, and (c) the PDCA (dynamic assignment) lower bound. All of these values were given in terms of the scaling factor $\lambda$ by which the demands were scaled in order to make the scaled demand vector feasible in the network. FIGS. 7, 8, and 9 show the simulation results, with each data point representing the average of the performance attained by varying the number of flows (5, 10, 15, 20, 25) in the grid.

In FIG. 7, the y-axis is normalized with respect to the upper bound for the case of 1 radio per node and 1 channel. Since the maximum degree of a node in the grid is only 4, the number of radios was varied from 1 to 4, and the number of channels was varied from 1 to 10. From FIG. 7, it can be seen that the capacity curve is convex, as might be expected. However, an interesting observation emerges from this data. Given $\kappa$ radios per node, the capacity increases almost linearly up to $\kappa+1$ channels. This is counter-intuitive, since it would be expected that the near-linear capacity increase would stop after $\kappa$ channels. The results seem to indicate that this trend continues for one additional channel. This pattern is not observed when the number of radios is 4, since the maximum degree of nodes is only 4, and only one channel can be assigned for each link to a neighbor ($\mathcal{L}(e)=1$).

In FIG. 8, the performance of the PDCA algorithm is compared for $T_d=1$ with respect to the upper bound. Recalling that the performance of the link-channel assignment algorithm is given by $$\frac{M}{NS}\lambda*\bar{r},$$

where $\lambda*\bar{r}$ is the upper bound from the linear program, $$\frac{M}{NS}$$

is thus plotted as a percentage in this plot. Once again, the values were averaged over multiple flow sets. It is evident that when channels are assigned dynamically at every time period, the PDCA algorithm performs within 80% of the capacity upper bound. The algorithm, in fact, achieves close to the capacity when the number of channels exceeds the number of radios by 2. This is a result of the flexibility in packing afforded by the greater number of channels.

In FIG. 9, the performance of the static BSCA algorithm is evaluated with respect to the PDCA algorithm. It can be seen that the BSCA algorithm does not really match the PDCA algorithm even when the number of channels is increased. However, this is to be expected, since, once the channels are bound, the greedy-coloring-based scheduling algorithm will account for most of the sub-optimal behavior. It is noted that, when there is only one channel in the network, the greedy coloring is the cause for the performance penalty. While this penalty is reduced when more channels are available, it still remains a significant component. In spite of this, the BSCA algorithm still performs within 60% of the PDCA algorithm.

The PDCA and BSCA algorithms were also tested on randomly-generated connected-graph topologies. The sources and destinations were randomly chosen in this scenario, as opposed to the grid corresponding to FIGS. 7, 8, and 9. The numbers of nodes, links, and flows in the graphs were varied, and correlation was measured between various graph parameters, such as maximum and average degree, maximum and average path length of flows, and connectivity of the graph to the solutions generated by the linear program and the PDCA and BSCA algorithms. Ten random-graph topologies were tested. The number of nodes in random graphs varied from 15 to 50, with the average node degree varying from 3 to 9. The maximum degree of the graph varied from 7 to 20, while the connectivity of the graphs varied from 1 to 4. The path length of the flows ranged from 1 to 10. The results suggest that the relative performance of the algorithms with respect to the linear program was not dependent on any combination of the above graph parameters.

Figure 10:
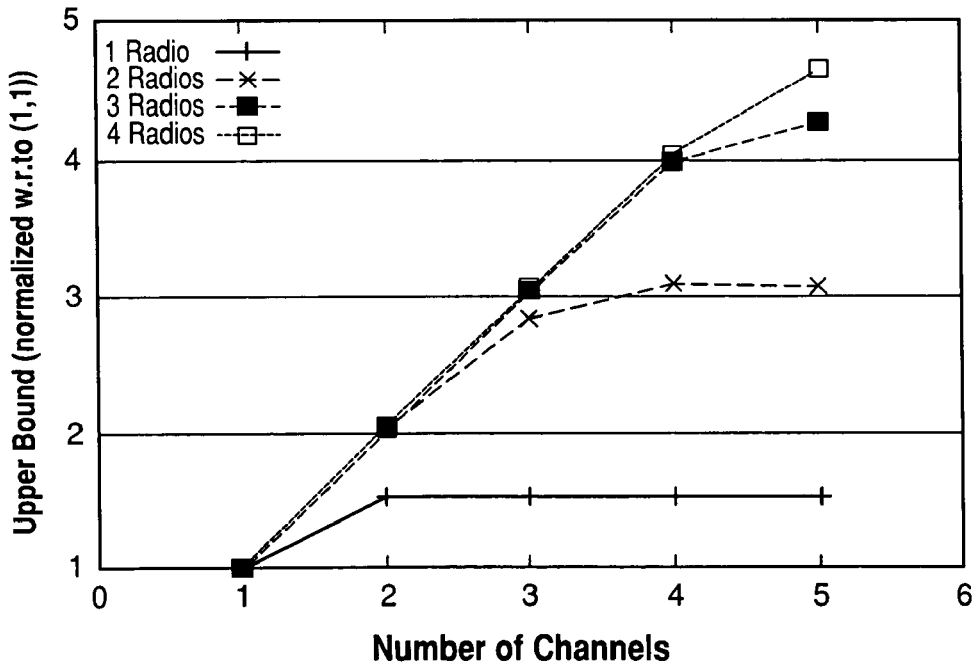
FIG. 10 is a graph showing simulation results for capacity upper bound with varying numbers of channels in a random-graph topology consistent with one embodiment of the present invention.
Figure 11:
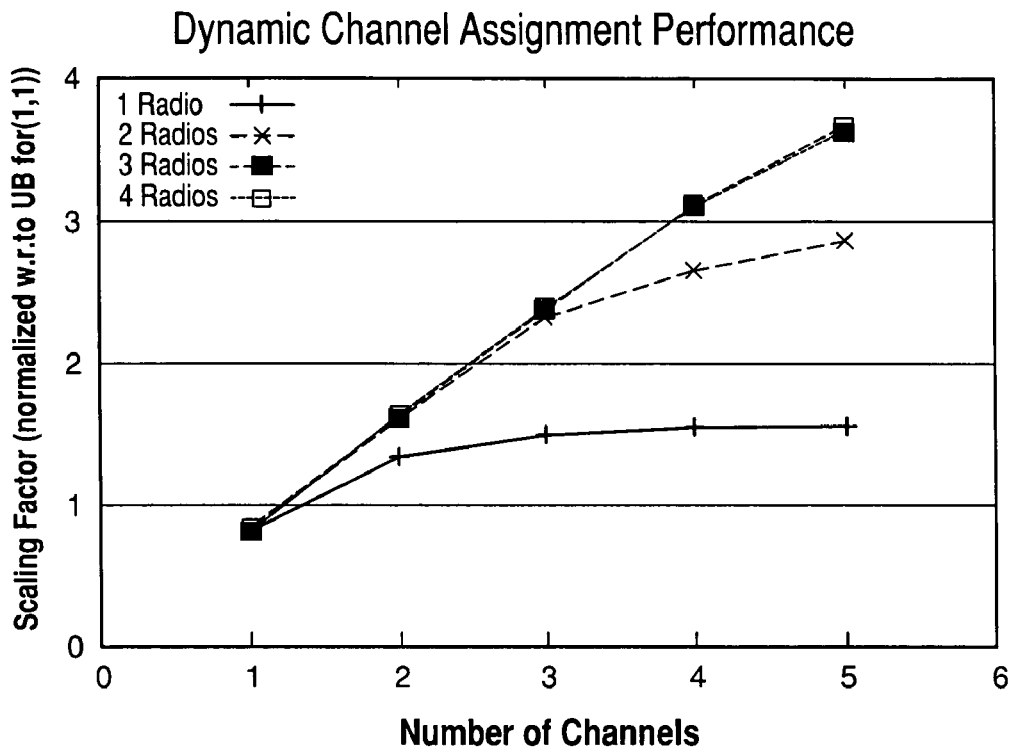
FIG. 11 is a graph showing simulation results for the performance of a PDCA algorithm in a random-graph topology consistent with one embodiment of the present invention.
Figure 12:
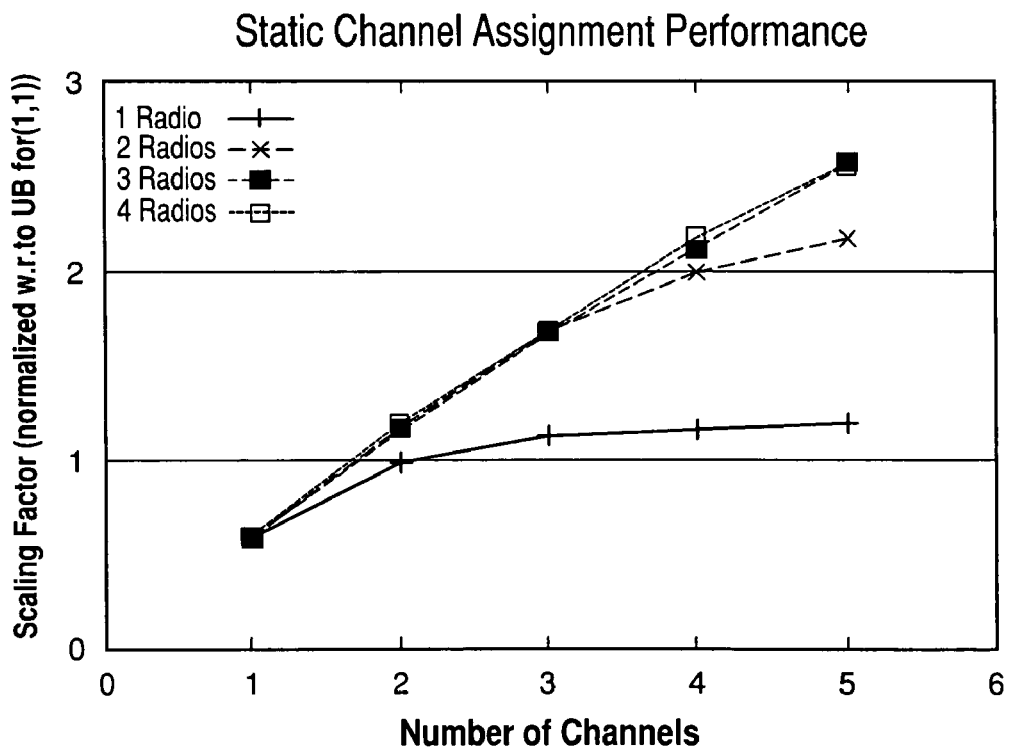
FIG. 12 is a graph showing simulation results for the performance of a static BSCA algorithm with respect to a PDCA algorithm in a random-graph topology consistent with one embodiment of the present invention.

The results from these experiments are presented in FIGS. 10, 11, and 12. The y-axes in all of these figures show that the performance (feasible demand-scaling factor) is normalized with respect to that of the capacity upper bound for (link, channel)=(1, 1). Each data point was averaged over the 10 random graph topologies.

FIG. 10 shows that the capacity increases almost linearly with κradios for up to κ+1 channels. This suggests that, in order to make the best use of X available orthogonal channels, at least X−1 radios per node may be needed. The gains in capacity diminish quickly beyond this point. Based on Kyasanur, P., and Vaidya, N., "Capacity of Multi-Channel Wireless Networks: Impact of Number of Channels and Interfaces," ACM Mobicom, 2005, it is observed that, in this model, a linear increase in capacity can be expected, as long as the ratio of X/κ is O(log n). The results tend to agree with this observation in both the grid and random-graph topologies.

FIGS. 11 and 12 show the performance of the PDCA and BSCA algorithms for the random graphs. The results show that, while the trend in capacity improvement is similar to that of the upper bounds, the PDCA algorithm uses more channels to achieve the same gain as the upper bound, and the BSCA algorithm uses even more channels than the PDCA algorithm. Interestingly, in both algorithms, the performance with 3 or 4 radios is similar to the performance for up to 5 channels. The performance in this case will differ when more channels are included.

Figure 13:
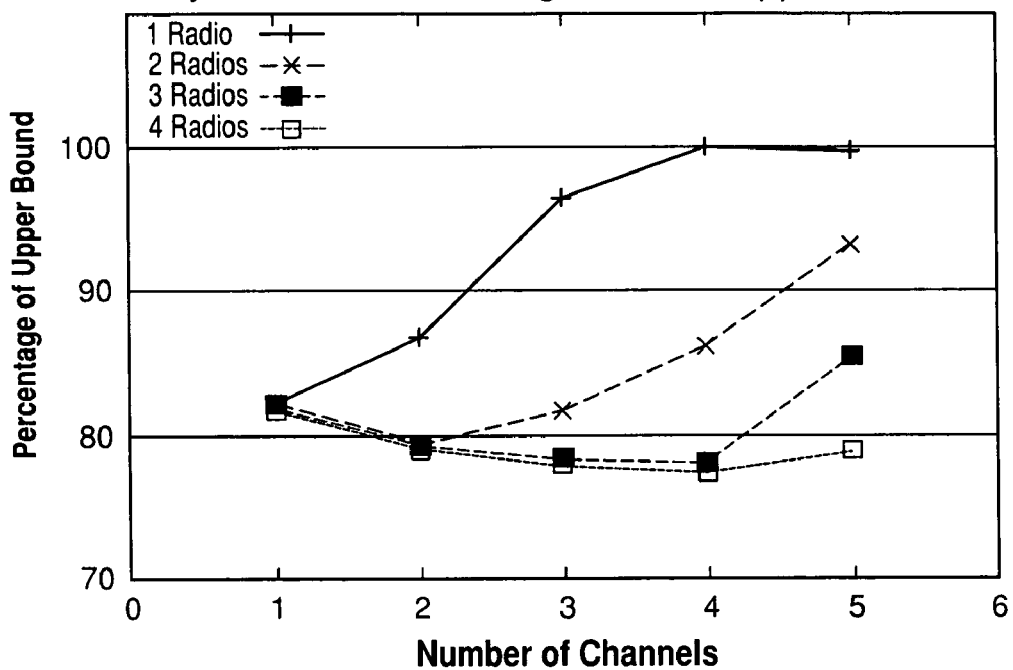
FIG. 13 is a graph comparing a PDCA algorithm with the capacity upper bound in a random-graph topology consistent with one embodiment of the present invention.

In FIG. 13, the PDCA algorithm is compared with the capacity upper bound, and it is found to achieve 75% of the upper bound on the average. The worst-case performance that was observed with PDCA in all tested topologies was 55% of the capacity upper bound. Another interesting fact is that, if there are fewer channels than the number of radios per node, then the relative performance of the link-channel assignment algorithms decreases with an increasing number of channels. The relative performance improves steadily beyond a certain point until it saturates at a latter point. This pattern is observed even in the results for the grid topology of the previous example, and for both the PDCA and BSCA algorithms. This is believed to reflect the efficiencies in these algorithms.

Figure 14:
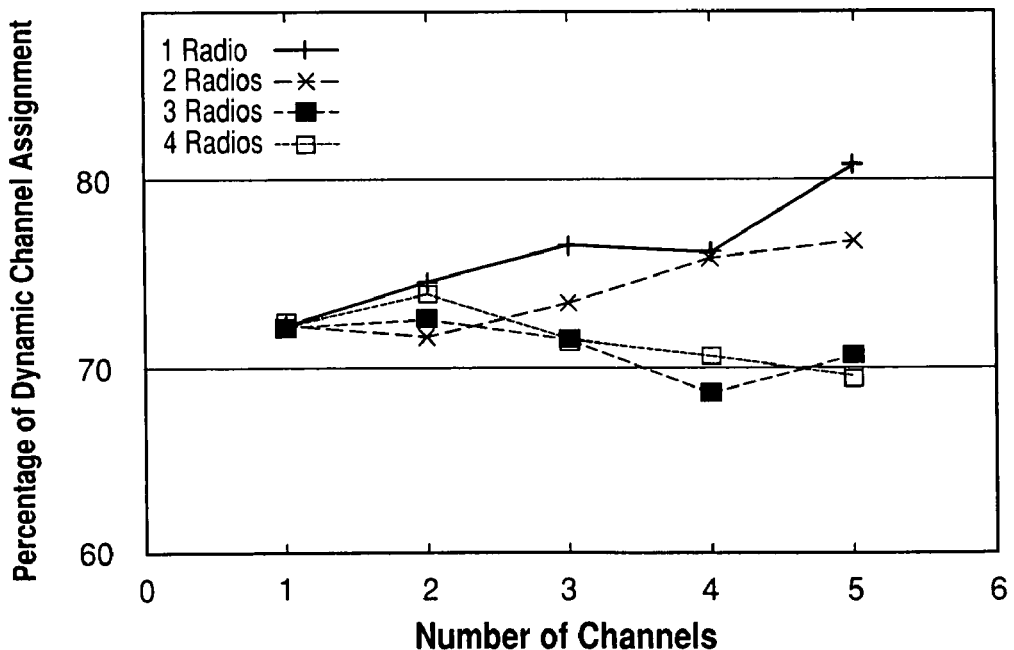
FIG. 14 is a graph showing simulation results for the performance of a static BSCA algorithm with respect to a PDCA algorithm in a random-graph topology consistent with one embodiment of the present invention.

In FIG. 14, similar results are shown for the performance of the BSCA algorithm versus that of the PDCA algorithm. The BSCA algorithm performs, in the worst case, within 50% of the PDCA algorithm, based on the experimental observations. It is noted that the small gap between the capacity upper bound and the PDCA performance implies not only that the PDCA performs close to capacity, but also that the linear program models the achievable capacity with good accuracy. Thus, the relaxation of the integer constraints in Inequalities (1), (2) and (4) to flow constraints in Lemma 1 does not significantly penalize the model for practical instances of wireless mesh networks.

The network modeling described above may be extended in at least several respects. In a practical wireless network scenario, there might be directional antennas at some nodes, and the network might use heterogeneous radios as part of the multiple-orthogonal channel regime. For example, 802.11b and 802.11a radios may co-exist in the network, for a total of 3+12=15 orthogonal channels. However, if a node has two 802.11b radios and one 802.11a radio, then the two 802.11b transceivers share only the three channels, while the one 802.11a radio has the flexibility of choosing any one of the 12 channels. These restrictions should be modeled in any network characterization.

As to heterogeneous radios, it is assumed that there are M different radio systems in the network. In the model presented above, the interference constraints remain unchanged, since they are specified for each individual channel. The link-channel and node-radio constraints given by Inequalities (1) and (2), respectively, may be rewritten as follows. For radio system j, where j=1,2, ..., M, $OC_j$ is the channel set, $C_j$ is the number of channels, $\varrho_j(e)$ is the maximum number of channels over link e, and κ(e) is the number of radios at node v, these radio-system-indexed variables can be substituted in place in the link-channel and node-radio constraints and can be specified for every radio system in the network to obtain the constraints for a heterogeneous radio network. The relaxation to continuous variables follows similarly, using radio-system-indexed parameters. However, the link-channel allocation algorithms should be redesigned to accommodate the splitting of link flows between the various radio systems.

Directional antennas may be used to reduce interference between links, apart from other uses. The impact of including directional antennas is felt in the interference constraints. The constraint described in Inequality (4) represents a group of mutually-interfering links. With directional antennas leading to directional data and interference links, this is no longer true. Instead of considering all links incident on two neighbors as mutual interferers, a subset of these links are treated as mutual interferers. To deal with this, the approach proposed above may be combined, e.g., with the modeling used in Jain, K., Padhye, J., Padmanabhan, V., and Qiu, L., "Impact of Interference on Multi-hop Wireless Network Performance," ACM Mobicom, September 2003. The set of links incident on either endpoint of a given link e are taken as a subgraph, and the conflict graph for this restricted subgraph is derived. Then, the maximal subgraphs are computed, and the interference constraints can be written for each link represented in the subgraph. Since this is done on a smaller subgraph, this approach is more scalable than the original approach proposed by Jain, Padhye, et al. The main observation is that the proposed model is extremely flexible and permits accommodation of a wide range of network constraints.

Thus, a network characterization has been presented that captures the constraints associated with multi-channel multi-radio (MC-MR) multi-hop wireless mesh networks. The model presented herein is extensible and can cover a wide variety of cases that reflect a range of practical constraints. An algorithm was presented that computes the optimal routes for a given objective of meeting a set of demands in the network using a set of necessary conditions as constraints. The approach used herein can be applied to optimize many other objective functions. Two link-channel assignment algorithms were also proposed, one static and the other dynamic, which permit the scheduling of flows on the links in the network. Simulations demonstrated that the proposed routing, link-channel assignment, and scheduling algorithms are able to characterize network capacity and achieve a performance that is close to optimal.

Accordingly, the teachings of certain embodiments of the present invention are believed to provide valuable tools for network designers in planning network deployment and in controlling performance objectives in the emerging field of wireless mesh networks.

A method consistent with one embodiment of the present invention may provide one or more of the advantages of more efficient utilization of network capacity, reduced congestion at network nodes, and higher packet throughput of the network. The method may be implemented for a requested path by either a centralized network management system (e.g., using a centralized server, such as the gateway of FIG. 1, to implement the method at a single node to serve the entire network), or by each node of the network (e.g., using a server implementing the method at each node), or both. An implementation employing a centralized network management system that distributes results to network nodes may be preferred for coordination of provisioning of new paths. A distributed implementation in each node of the network may be preferred when no centralized network management system exists and/or if the requested path is a distributed request implemented with control packets routed through a network.

The Greedy Channel-Scheduling (GCS) Algorithm is another embodiment of a dynamic channel-assignment algorithm, in which a link can be assigned to multiple channels in a given time period, i.e., $\theta(e) \geq 1$. The linear program described above with regard to the PDCA algorithm, e.g., as given in Linear Programming Formulation (I), provides an upper bound on the achievable rates in the mesh network. The linear programming solution is used to assign channels to the links and also to schedule the time periods in which each link and channel is active. Both of these problems are NP-hard. As a first-cut approach, a variation of the greedy coloring algorithm proposed above is used to solve the problem. However, unlike the algorithm set forth above, the following greedy algorithm is simpler, due to the fact that there are no restrictions on the number of channels that can be assigned simultaneously to a particular link. The following solution approximates the optimal solution by using a greedy packing-based heuristic.

The desired flow in link e corresponding to channel i is represented by the equation $f_i(e) = \Sigma_{q \leq Q} \hat{x}_i^q(e)$. Since the link flows do not necessarily have to be assigned to channels that are provided by the linear program solution, all of the flows on the different channels on a given link can first be aggregated into a single scaled flow on the link denoted by the equation $f^M(e) = M \Sigma_i f_i(e)$. The value of M was set to 100 in experiments performed by the inventors, in order to make the fractional part negligible. As the flows are packed in each time period, the amount of unassigned flow on link e is denoted by the variable d(e).

At the beginning of each time period, the links are sorted in descending order of the unassigned flows. The first link e is assigned to the channel $j = \arg\max_i c_i(e)$, and the value of d(e) is decremented by $c_j(e) T_d$. It is then determined whether the next link in the ordered list can be assigned to some channel in this time period. If so, then such a channel is selected having the highest capacity, and the link is assigned to that channel. If this link cannot be assigned to any channel, then the algorithm moves on to the next link, and this procedure is repeated until the end of the list is reached. The foregoing procedure is then repeated until no channels have been assigned to any link in an iteration. If unassigned flows still remain, then the algorithm moves on to the next time period, and the assignment process is repeated. The objective is to assign all flows in as few time periods as possible.

To determine whether a particular channel is feasible for a data link in a given time period, a binary variable $z_s$ is associated with each constraint set S. At the beginning of each time period, $z_s$ is set to zero. The variable $z_s$ is set to one whenever a data link e is assigned channel i, and $(e,i) \in S$. It is ensured that the node-ratio constraint is respected at each node by verifying that the number of channels allocated to a given node in any time period is not greater than the number of radios at that node.

FIG. 15 shows exemplary pseudo-code for implementing the foregoing-described greedy scheduling algorithm. In this algorithm, the variable T(e,i) is used to denote the collection of constraint sets that are associated with the link-channel pair (e,i), and the variable NS is used to count the number of time periods. The demand met by the system is computed as $$\frac{M}{NS} \lambda^* \bar{r},$$

where $\lambda^* \bar{r}$ is the optimal solution to the linear program, and M is the multiplicative factor used to convert the link flows to integral values.

Using simulations, the performance of the foregoing-described greedy channel-scheduling algorithm was quantitatively evaluated against the upper bounds on capacity derived using the optimization framework described above. Three key aspects are highlighted: (i) the ability of the necessary conditions based on continuous flow variables to model the capacity of the network in practical circumstances, (ii) the performance of the greedy channel-scheduling algorithm with respect to the capacity of the network, and (iii) the variation in achievable channel capacity as the number of radios ad channels vary. In the simulations, mesh network topologies were simulated wherein the product of the number of links and the number of orthogonal channels did not exceed 10,000.

The goal of the test methodology was to measure the achievable capacity for a large network. The optimization framework allowed for a multi-commodity flow problem formulation. Therefore, each node was permitted to select a randomly chosen node as its destination, and a demand of 1 unit of flow, end-to-end, for all source-destination pairs, was set. When the feasibility/concurrent flow problem was solved in this scenario, a scaling factor $\lambda^*$ was obtained, which implies that all end-to-end flows can send at most $\lambda^*$ units of flow. Thus, the total network capacity was upper-bounded as $n.\lambda^*$. The greedy channel-scheduling algorithm was then run to obtain an achievable schedule, and a lower bound on the capacity from the schedule was computed. A "good" schedule is on that has a very small gap between the upper and lower bounds on capacity.

The number of radios per node was set to be the same across all nodes, i.e., $\kappa(v) = \kappa$, $\forall v \in V$, and the links were set to be of unit capacity for all channels, $c_i(e) = 1$, $\forall i \in OC$, $e \in E$. All channels were orthogonal. Wireless channel errors were not modeled, as the goal was to estimate the maximum capacity of the network. The experiments were conducted for large topologies, and the results presented below are an average of five random topologies, each with 100 nodes. The number of links in each of these topologies varied from 350 to 900. There are no partitions in the network graph, and all links were bi-directional. Multi-path routing was enabled in all of these instances, and the number of channels varied from 1 to 8. Two parameters were measured for each topology: (a) the capacity lower bound and (b) the greedy channel-scheduling lower bound. All of these values are in terms of scaling factor $\lambda$.

Figure 16:
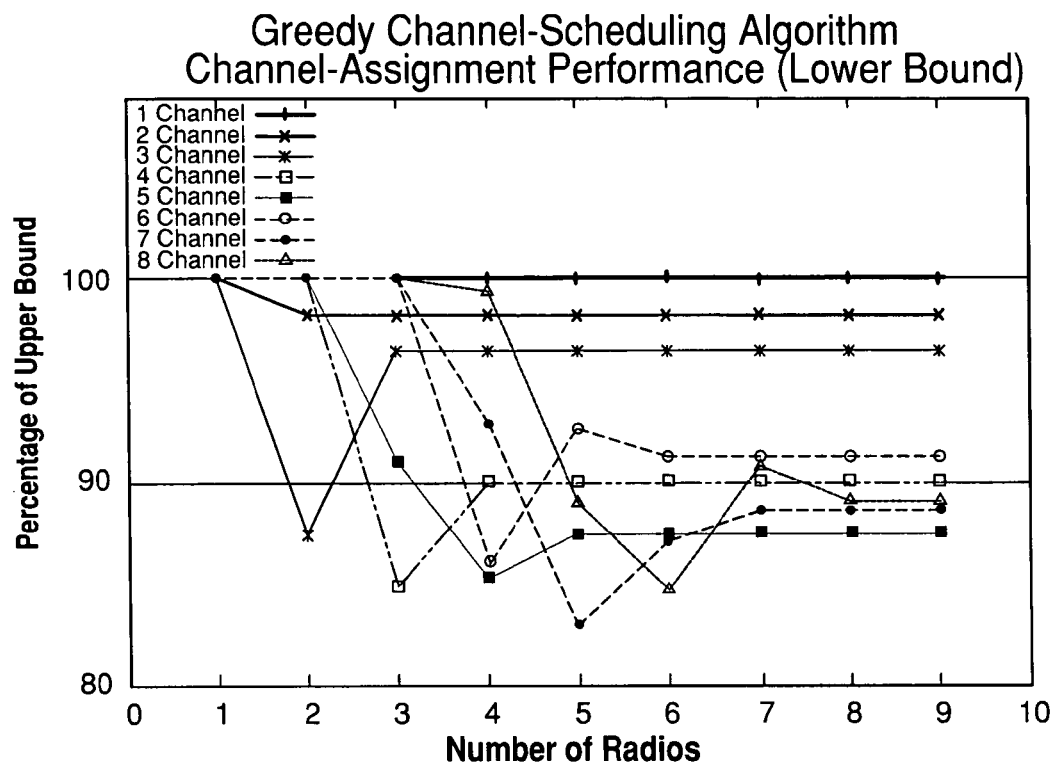
FIG. 16 is a graph showing simulation results for the channel-assignment performance of a GCS algorithm in a random-graph topology consistent with one embodiment of the present invention.
Figure 17:
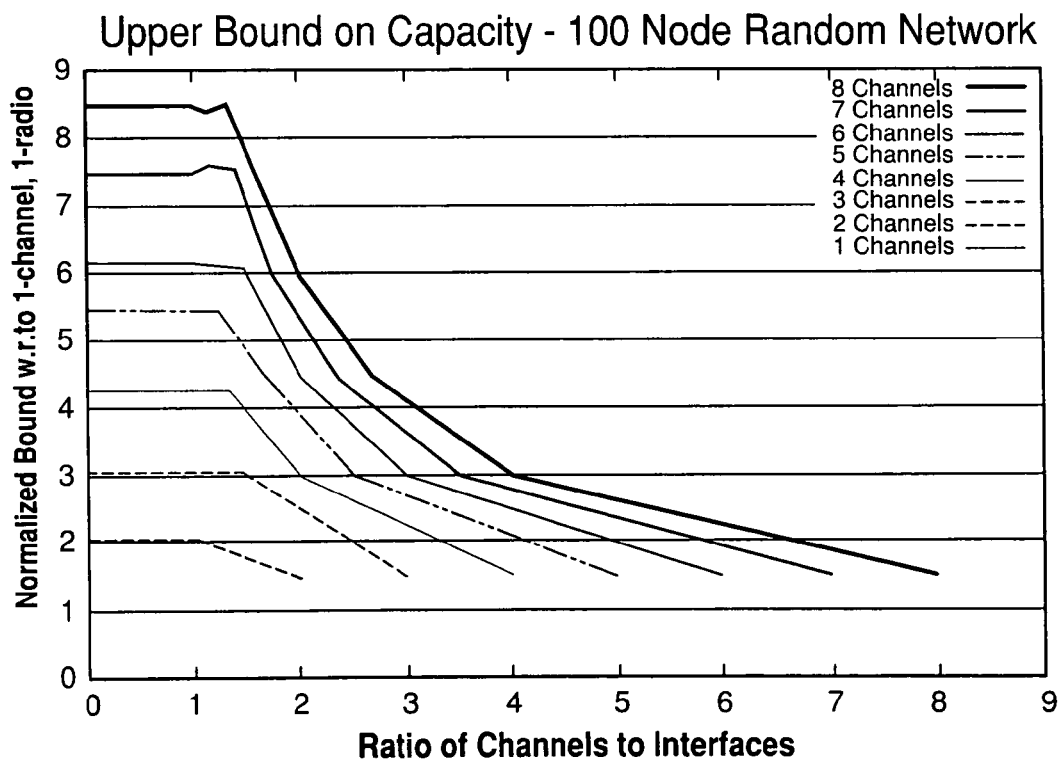
FIG. 17 is a graph showing the upper bound on capacity in a GCS algorithm in a random-graph topology consistent with one embodiment of the present invention.
Figure 18:
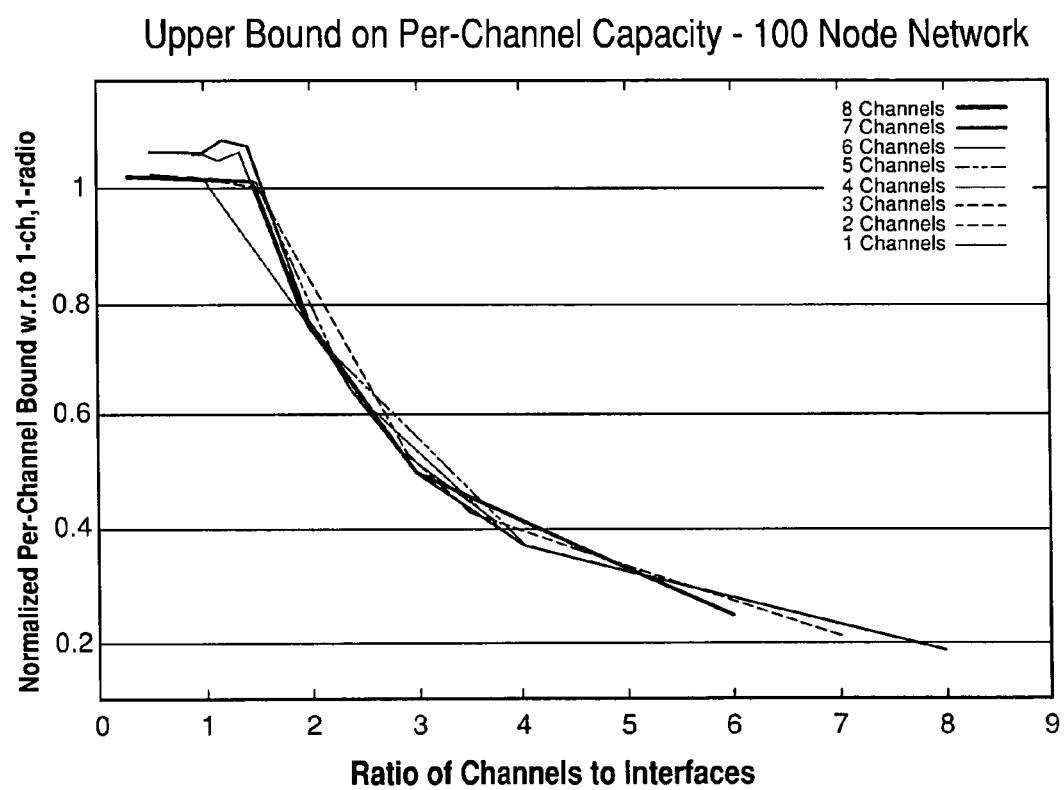
FIG. 18 is a graph showing the upper bound on per-channel capacity in a GCS algorithm in a random-graph topology consistent with one embodiment of the present invention.

FIGS. 16, 17, and 18 summarize the results of the foregoing simulations. FIG. 16 illustrates the first set of results and shows the performance of the GCS algorithm. For all combinations of channels and numbers of radio interfaces per node, the greedy channel-scheduling algorithm performed within 80% of the upper bound and was typically within 90% of the upper bound in most instances. While the "worst" cases were not encountered in the topologies considered herein, the inventors tested this algorithm on many other smaller topologies, and the results presented herein are typical of those cases.

In addition to proving the efficacy of the GCS algorithm, FIG. 16 can also be used to infer that the upper bounds are a valid approximation of the network capacity. Hence, the upper-bound numbers will now be used to explain the capacity of the network.

The inventors have observed that the network capacity of an MC-MR network depends primarily on the ratio of the number of channels to the number of interfaces per node, and not on the individual values themselves. The results shown in FIGS. 17 and 18 confirm this observation.

For example, in FIG. 17, network capacity $n.\lambda^*$, which is normalized with respect to the upper-bound of the capacity of a network with 1 channel and 1 radio interface per node, is shown on the y-axis. Each data point is averaged over 5 random graph topologies with 100 nodes each, as described above. The results confirm that network capacity starts declining as soon as the ratio $C/\kappa$, exceeds a certain threshold.

In FIG. 18, the network capacity is shown for each channel, again normalized by the network capacity for the 1-channel, 1-radio case. These results affirm that network capacity of an MC-MR network depends primarily on the ratio of the number of channels to the number of interfaces per node, and not on the individual values themselves. These results also show that the $$\theta\left(W\sqrt{\frac{n}{\log n}}\right)$$

function is tightly-bounded, since the per-channel network capacity does not vary significantly at all. (When $f()=\theta(g())$ is tightly-bounded, it implies that $c_1 g( ) \leq f( ) \leq c_2 g$, with $c_2/c_1 \approx 1$.)

However, the most significant inference from these results is the fact that the threshold for $C/\kappa$ beyond which network capacity begins to decrease is very small, in fact, close to 1.5. Since the network capacity of an MC-MR network depends primarily on the ratio of the number of channels to the number of interfaces per node, and not on the individual values themselves, the network capacity decrease threshold is $O(\log n)$. It is noted that, for a 100-node network, $\log_{10} 100 = 2$ and $\log_e 100 = 4.61$. This suggests that the constants associated with the $O( )$ notation are small enough to deny any potential benefits that might be expected from this capacity trend for a reasonably large MC-MR network. Clearly, this threshold will increase for a larger network, but the increase will be meaningful only when the network size increases by a few orders of magnitude. Thus, the notion that a single radio per node might be potentially good enough to maximize network capacity might be valid only for networks with either millions of nodes, or networks with only one channel of operation. A single radio could also perform similar to a multiple radio-per-node network when the traffic load is light, although this does not mean capacity will be the same.

It should be recognized that, while the networks described in the above embodiments are wireless multi-hop mesh networks, the present invention could be used with other types of wireless networks, wired networks, optically-connected networks, or hybrid networks that include combinations of wired, wireless, and/or optically-connected elements.

The various functions of a method consistent with one embodiment of the present invention may be implemented with circuit elements or may also be implemented in the digital, domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A server-implemented method of characterizing a capacity region in a multi-channel, multi-radio mesh network of nodes interconnected by links, the method comprising:
    (a) the server modeling the network;
    (b) the server obtaining a feasible upper-capacity bound by solving an optimization problem; and
    (c) the server using an algorithm that provides a feasible lower-capacity bound based on the solution to the optimization problem, wherein the algorithm comprises (i) receiving the solution to the optimization problem as input, (ii) allocating channels to links to meet a demand vector that satisfies a plurality of link-flow feasibility constraints, and (iii) scheduling flows along the allocated channels;
    wherein:
       the upper- and lower-capacity bounds define the capacity region;
       each of a plurality of nodes in the network has a number of channels and a number of radios; and
       in at least one of the plurality of nodes, the number of channels is different from the number of radios.

2. The method of claim 1, wherein, in step (a), the network is modeled by determining the link-flow feasibility constraints.

3. The method of claim 2, wherein, in step (b), the optimization problem uses the link-flow feasibility constraints as necessary conditions.

4. The method of claim 1, wherein at least one node in the network has two or more radios.

5. The method of claim 1, wherein two or more nodes in the network conform to different standards.

6. The method of claim 5, wherein one standard is one of IEEE 802.11 a/b/g, and another standard is 802.16.

7. The method of claim 1, wherein one or more of the link-flow feasibility constraints are derived from one or more node and/or channel characteristics.

8. The method of claim 7, wherein the node and/or channel characteristics comprise the maximum number of channels that can be active on a link during a time slot.

9. The method of claim 7, wherein the node and/or channel characteristics comprise the maximum number of radios that a node can use during a time slot.

10. The method of claim 1, wherein the link-flow feasibility constraints are derived, at least in part, by modeling interference from one or more neighboring nodes.

11. The method of claim 1, wherein the optimization problem is solved as a concurrent flow problem.

12. The method of claim 11, wherein the optimization problem is solved as a primal-dual algorithm.

13. The method of claim 12, wherein the primal-dual algorithm alternates between (i) sending flow along shortest-path pairs and (ii) adjusting the length of links along which flow has been sent, until an optimum solution is reached.

14. The method of claim 13, wherein:
 e represents a data link using channel i and having a capacity $c_i(e)$;
 $S_j$ represents a schedulable link-channel pair, with $\mathcal{L}$ representing the number of schedulable link-channel pairs in the set $\{S_1, \ldots, S\mathcal{L}\}$, $\mathcal{L} > 1$;
 $P_q$ represents a set of paths P for a source-destination pair q from s(q) to d(q);
 r(q) represents flow to be routed from s(q) to d(q);
 x(P) represents an amount of flow sent on path P;
 each schedulable link-channel pair $S_j$ has an associated constant $\beta(S_j)$, where $\beta(S_j) \neq 0$;
 $\lambda$ is a scaling factor of the network; and
 a primal formulation for the primal-dual algorithm is:
 maximize $\lambda$, subject to:

$$\sum_{(e,i) \in S_j} \frac{\sum_q \sum_{P \in \mathcal{P}_q : P \ni (e,i)} x(P)}{\beta(S_j) c_i(e)} \leq 1, \forall j \in \{1, 2, \ldots, \mathcal{L}\},$$

$$\sum_{P \in \mathcal{P}_q} x(P) = \lambda r(q), \forall q,$$

$$x(P) \geq 0, \forall P \in \mathcal{P}_q, \forall q.$$

15. The method of claim 1, wherein the algorithm is a static-channel assignment algorithm.

16. The method of claim 15, wherein the link-channel allocation is performed prior to the scheduling of the flows.

17. The method of claim 15, wherein the scheduling of the flows is performed by a greedy coloring algorithm.

18. The method of claim 17, wherein the greedy coloring algorithm assigns all flows in the fewest possible number of time slots.

19. The method of claim 1, wherein the algorithm is a dynamic-channel assignment algorithm.

20. The method of claim 19, wherein the link-channel allocation is performed substantially concurrently with the scheduling of the flows.

21. A server for characterizing a capacity region in a multi-channel, multi-radio mesh network of nodes interconnected by links, the server comprising a processor performing the steps of:
 (a) modeling the network by determining a plurality of link-flow feasibility constraints;
 (b) obtaining a feasible upper-capacity bound by solving an optimization problem using the link-flow feasibility constraints as necessary conditions; and
 (c) using an algorithm that provides a feasible lower-capacity bound by (i) receiving the solution to the optimization problem as input, (ii) allocating channels to links to meet a demand vector that satisfies the link-flow feasibility constraints, and (iii) scheduling flows along the allocated channels;
 wherein:
  the upper- and lower-capacity bounds define the capacity region;
  each of a plurality of nodes in the network has a number of channels and a number of radios; and
  in at least one of the plurality of nodes, the number of channels is different from the number of radios.

22. A server-implemented method of characterizing a capacity region in a multi-channel, multi-radio mesh network of nodes interconnected by links, the method comprising:
 (a) the server modeling the network;
 (b) the server obtaining a feasible upper-capacity bound by solving an optimization problem; and
 (c) the server using an algorithm that provides a feasible lower-capacity bound based on the solution to the optimization problem, the algorithm comprising scheduling flows using a greedy coloring algorithm;
 wherein:
  the upper- and lower-capacity bounds define the capacity region;
  each of a plurality of nodes in the network has a number of channels and a number of radios;
  in at least one of the plurality of nodes, the number of channels is different from the number of radios; and
  the greedy coloring algorithm comprises:
   (a) aggregating all flows on different channels on a link into a single scaled flow; and
   (b) at the beginning of each time slot:
    (i) forming an ordered list by sorting the links in descending order of unassigned flows; and
    (ii) for each link e in the ordered list:
     (1) assigning link e to a first channel for link e and decrementing the unassigned flow on link e;
     (2) selecting and assigning, for link e, a second channel with the highest capacity if the next link following link e in the ordered list can be assigned to the second channel in the time slot; and
     (3) repeating step (ii) for the next link following link e in the ordered list if the next link following link e in the ordered list cannot be assigned to a channel in the time slot.

* * * * *